(12) United States Patent
Nagatani

(10) Patent No.: US 6,977,642 B2
(45) Date of Patent: Dec. 20, 2005

(54) BACK LIGHT AND LIQUID CRYSTAL DISPLAY

(75) Inventor: Shinpei Nagatani, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 435 days.

(21) Appl. No.: 10/260,832

(22) Filed: Sep. 30, 2002

(65) Prior Publication Data

US 2003/0164815 A1  Sep. 4, 2003

(30) Foreign Application Priority Data

Mar. 1, 2002 (JP) .............................. 2002-056104

(51) Int. Cl.[7] .......................... G09G 3/36; G02F 1/1335
(52) U.S. Cl. ...................................... 345/102; 345/70
(58) Field of Search ........................... 345/102; 349/70

(56) References Cited

U.S. PATENT DOCUMENTS

| | | | |
|---|---|---|---|
| 5,754,012 A | 5/1998 | LoCascio et al. | 315/307 |
| 6,181,071 B1 * | 1/2001 | Yuuki et al. | 315/169.3 |
| 6,341,879 B1 * | 1/2002 | Skinner et al. | 362/295 |
| 6,469,755 B1 * | 10/2002 | Adachi et al. | 349/62 |
| 6,496,236 B1 * | 12/2002 | Cole et al. | 349/61 |
| 6,590,626 B1 * | 7/2003 | Suzuki et al. | 349/70 |
| 2001/0052955 A1 * | 12/2001 | Nagatani | 349/65 |

FOREIGN PATENT DOCUMENTS

| | | |
|---|---|---|
| DE | 198 42 761 | 3/2000 |
| EP | 574 993 | 12/1993 |
| GB | 2 018 532 | 10/1979 |
| JP | 61-285429 | 12/1986 |
| JP | 5-080333 | 4/1993 |
| JP | 6-289363 | 10/1994 |
| JP | 10-10492 | 1/1998 |
| JP | 2000-331520 | 11/2000 |
| JP | 2000-1075092 | 3/2001 |
| JP | 2001-307531 | 11/2001 |

OTHER PUBLICATIONS

Goto et al.; "Measurements of Hg Particle Densities and Electron Temperature in Ar-Hg Discharge Plasma under an Increased Pressure Ar and in Narrow Tube"; *Proceedings International Conference on Phenomena in Ionized Gases*; vol. 4, pp. 263-264; Jul. 22, 2001.

\* cited by examiner

*Primary Examiner*—Patrick N. Edouard
*Assistant Examiner*—M. Fatahiyar
(74) *Attorney, Agent, or Firm*—Greer, Burns & Crain, Ltd.

(57) ABSTRACT

A back light is provided with light sources, lighting control circuits for lighting the light sources, respectively, and a brightness control circuit for outputting light volume adjusting signals to the lighting control circuits, respectively. The brightness control circuit receives a luminance adjusting signal, adjusts only a part of the light volume adjusting signals, and fixes output of the rest of the light volume adjusting signals. The lighting control circuits apply voltages corresponding to the light volume adjusting signals to the light sources, thereby adjusting the light sources in luminance. The light volume adjusting signals can be adjusted one by one, which facilitates luminance adjustment. Thus, by lighting only one light source at the minimum luminance, the screen brightness of the liquid crystal display having this back light can be lowered to an appropriate level when it is used in dark places.

14 Claims, 13 Drawing Sheets

BACK LIGHT AND LIQUID CRYSTAL DISPLAY

BACKGROUND OF THE INVENTION

1. Field of the Invention

The present invention relates to a liquid crystal display and a back light to be arranged behind a liquid crystal panel in the liquid crystal display.

2. Description of the Related Art

Generally, liquid crystal displays have a liquid crystal panel and a back light for irradiating the backside of the liquid crystal panel with light. In recent years, liquid crystal displays have improved and approached CRTs (Cathode Ray Tubes) in terms of performance. Liquid crystal displays thus have found an increasing range of applications, including navigation systems to be mounted on motor vehicles.

In motor vehicles, the interior brightness varies greatly between daytime and nighttime hours. Cars are dark inside in the nighttime, so that cars' navigation systems must be lowered sufficiently in screen brightness in the nighttime. That is, liquid crystal displays for use in the navigation systems need to have a smaller minimum luminance for the sake of nighttime use.

FIG. 1 shows a block diagram of a control circuit in a back light 10 to be used for this type of liquid crystal display. In the diagram, the back light 10 includes an oscillating circuit 12, lighting circuits 14a, 14b, and 14c, a light volume adjusting circuit 16, and fluorescent tubes 18a, 18b, and 18c.

The light volume adjusting circuit 16 receives brightness adjusting input which is generated in accordance with a luminance adjusting signal from exterior, and outputs, to the oscillating circuit 12, a light volume adjusting signal for adjusting the fluorescent tubes 18a, 18b, and 18c in brightness. The oscillating circuit 12 generates an alternating voltage corresponding to the light volume adjusting signal out of the power supplied from a power source, and outputs the generated alternating voltage to the lighting circuits 14a, 14b, and 14c. The lighting circuits 14a, 14b, and 14c boost the alternating voltage output from the oscillating circuit 12, and supply the boosted voltages to the fluorescent tubes 18a, 18b, and 18c. The fluorescent tubes 18a, 18b, and 18c light up at luminances corresponding to the voltage waveforms supplied.

FIG. 2 shows an overview of structure of a light emitting part 10a in the back light 10. The light emitting part 10a has a reflector 20 for accommodating the fluorescent tubes 18a, 18b, and 18c.

The inner surface of the reflector 20 is given a reflecting coat of metal. The fluorescent tubes 18a, 18b, and 18c are arranged in parallel inside the reflector 20. The light emitted from the fluorescent tubes 18a, 18b, and 18c radiates out directly or after reflected from the inner surface of the reflector 20.

In the back light 10 shown in FIG. 1, the single light volume adjusting circuit 16 adjusts the plurality of fluorescent tubes 18a, 18b, and 18c in luminance. On this account, when the back light 10 produces an output of the minimum luminance, the fluorescent tubes 18a, 18b, and 18c are lit at their respective minimum luminances. Consequently, the minimum luminance possible for the back light 10 to output is the sum of the minimum luminances of the individual fluorescent tubes 18a, 18b, and 18c. When liquid crystal displays having such a back light are applied to the navigation systems, the screen brightness cannot be lowered to an appropriate brightness in nighttime use.

According to the structure of the light emitting part 10a of the back light 10 shown in FIG. 2, the central fluorescent tube 18b faces a smaller area of the reflector 20 and the outer fluorescent tubes 18a and 18b face greater areas of the reflector 20. The parasitic capacitance occurring between the fluorescent tube 18b and the reflector 20 is therefore smaller than the parasitic capacitance occurring between the fluorescent tube 18a and the reflector 20, and the parasitic capacitance occurring between the fluorescent tube 18c and the reflector 20.

Therefore, the current to flow through the fluorescent tube 18b is greater than the currents to flow the fluorescent tubes 18a and 18c. This shortens the life of the fluorescent tube 18b more than the lives of the fluorescent tubes 18a and 18c. In general, fluorescent tubes of a back light cannot be replaced separately. Thus, the entire back light must be replaced when any one of the fluorescent tubes no longer works. That is, the life of a back light becomes shorter depending on the fluorescent tube of the shortest life.

Recently, parts of the liquid crystal displays tend to get smaller in size due to a growing demand for liquid crystal panels of larger size. The reflectors accommodating the fluorescent tubes of the back lights also have the inclination to shrink in size. This results in reducing interior spaces of the reflectors and easy trapping of heat within the reflectors. Consequently, if a plurality of fluorescent tubes is used, there is a possibility that concentrate generated heat therein may hamper sufficient heat dissipation.

SUMMARY OF THE INVENTION

It is an object of the present invention to provide a back light capable of further reducing the minimum value of luminance and a liquid crystal display equipped with this back light.

Another object of the present invention is to prolong the life of the fluorescent tubes constituting the back light.

Another object of the present invention is to dissipate heat produced by the light sources constituting the back light with higher efficiency.

According to one of the aspects of the back light and the liquid crystal display of the present invention, a brightness control circuit selects at least one of light volume adjusting signals and fixes output of the light volume adjusting signals other than the selected light volume adjusting signal. On this account, the light sources other than the light source corresponding to the selected light volume adjusting signal will not change in luminance. The light sources are arranged, for example, behind a liquid crystal panel.

When a luminance adjusting signal changes, the brightness control circuit adjusts the selected light volume adjusting signal and outputs the same to a lighting control circuit so that the luminance of the back light (the total luminance of the light sources) approaches a luminance indicated by the luminance adjusting signal. The lighting control circuit receiving the adjusted light volume adjusting signal generates a voltage having a waveform corresponding to the received light volume adjusting signal and applies the same to the light source. The light source is on at a luminance corresponding to the waveform of the voltage applied from the lighting control circuit. Then, the light source corresponding to the selected light volume adjusting signal is adjusted in luminance, so that the back light changes in luminance. Subsequently, the brightness control circuit fixes the output of the selected light volume adjusting signal and selects one or more of the light volume adjusting signals according to need. Then, the same luminance adjustment as described above is performed.

The back light of the present invention can adjust the light volume adjusting signals one by one to change the luminances of the light sources, whereby the luminance adjustment control of the back light is facilitated. Since the plurality of light sources can be successively adjusted in luminance, minimum light sources alone can be turned on at their respective minimum luminances with the rest of the light sources turned off. For example, turning only a single light source on at its minimum luminance enables the minimum luminance of a single light source to be the minimum luminance of the back light. Consequently, when the back light and the liquid crystal display of the present invention are used in dark places, the screen brightness can be lowered to an appropriate brightness.

According to another aspect of the back light of the present invention, an adjusting part adjusts the selected light volume adjusting signal to lower its corresponding light source in luminance (luminance-down operation) when the luminance indicated by the luminance adjusting signal is smaller than the actual total luminance of the light sources. A detecting part outputs a detecting signal to the adjusting part when the luminance of the light source corresponding to the selected light volume adjusting signal is minimum.

On receiving the detecting signal, the adjusting part fixes the selected light volume adjusting signal to a turn-off level to turn off the corresponding light source (turn-off operation), and selects anew at least one of the rest of the light volume adjusting signals corresponding to a lit light source (selecting operation). In this state, when the luminance indicated by the luminance adjusting signal is smaller than the actual luminance of the back light, the adjusting part adjusts the newly selected light volume adjusting signal to lower the corresponding light source in luminance.

The adjusting part thus performs the luminance-down operation, turn-off operation, and selecting operation in succession to adjust the luminance of the back light. Since the reception of the detecting signal can facilitate detecting that the light source has reached its minimum luminance, the control of lowering the luminance of the back light can be simplified.

According to another aspect of the back light of the present invention, the adjusting part temporarily adjusts the light volume adjusting signal corresponding to at least one of the lit light sources in synchronization with the selected light volume adjusting signal's turning to the turn-off level, thereby enhancing the corresponding light source in luminance temporarily. Consequently, the back light can be prevented from dropping in luminance when a light source lit at its minimum luminance is turned off.

According to another aspect of the back light of the present invention, the detecting part includes a monitoring circuit for directly detecting currents supplied to the light sources. The detecting part can thus detect the luminances of the light sources with higher precision. That is, the detecting part can detect more precisely that light sources are lit at the minimum luminances. This allows the detecting part to output the detecting signal to the adjusting part with more accurate timing. As a result, the detecting part can perform precise control of lowering the luminance of the back light.

According to another aspect of the back light of the present invention, a fluorescent tube causing a smaller parasitic capacitance with the reflector is subjected to an effective voltage relatively lower than that applied to the rest of the fluorescent tubes. Consequently, the fluorescent tube with smaller parasitic capacitance is supplied with a current smaller than the rest of the fluorescent tubes are. The fluorescent tube with smaller parasitic capacitance leaks a current smaller than the rest of the fluorescent tubes do, resulting in equalizing the currents which contribute to light emission of the fluorescent tubes. The lives of fluorescent tubes can thus be made equal to each other. As a result, the life of the back light can be prolonged.

According to another aspect of the back light of the present invention, a fluorescent tube causing a smaller parasitic capacitance with the reflector is smaller in diameter than the rest of the fluorescent tubes, and this is the smaller the diameter, the higher the impedance. Consequently, given that the same effective voltage is applied to all the fluorescent tubes, the fluorescent tube with higher impedance is supplied with a current smaller than the rest of the fluorescent tubes are. Here, the fluorescent tube with higher impedance leaks a current smaller than the rest of the fluorescent tubes do, so that the amounts of the currents contributing to light emission of the fluorescent tubes become equal to each other. This enables the fluorescent tubes to be identical in life. The life of the back light can be prolonged accordingly.

According to another aspect of the back light of the present invention, the fluorescent tube causing a smaller parasitic capacitance with the reflector is higher in internal gas pressure than the rest of the fluorescent tubes, and this is the smaller the internal gas pressure, the higher the impedance. Consequently, given that the same effective voltage is applied to all the fluorescent tubes, the fluorescent tube with higher impedance is supplied with a current smaller than the rest of the fluorescent tubes are. Here, the fluorescent tube with higher impedance leaks a current smaller than the rest of the fluorescent tubes do so that the amounts of the currents contributing to light emission of the fluorescent tubes become equal to each other. This enables the lives of the fluorescent tubes to be identical. The life of the back light can be prolonged accordingly.

According to another aspect of the back light of the present invention, each reflector accommodates a single light source. This allows dissipation of heat produced by the light sources with higher efficiency.

In addition, the parasitic capacitances occurring between the light sources and the respective reflectors can be substantially equalized so that the amounts of the current leakage from the light sources to the respective reflectors can be also equalized. Accordingly, the amounts of the currents contributing to light emission of the light sources become equal to each other, whereby the light sources can be made identical in life. As a result, the life of the backlight can be prolonged.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, embodiments of the present invention will be described with reference to the drawings.

Figure 1:
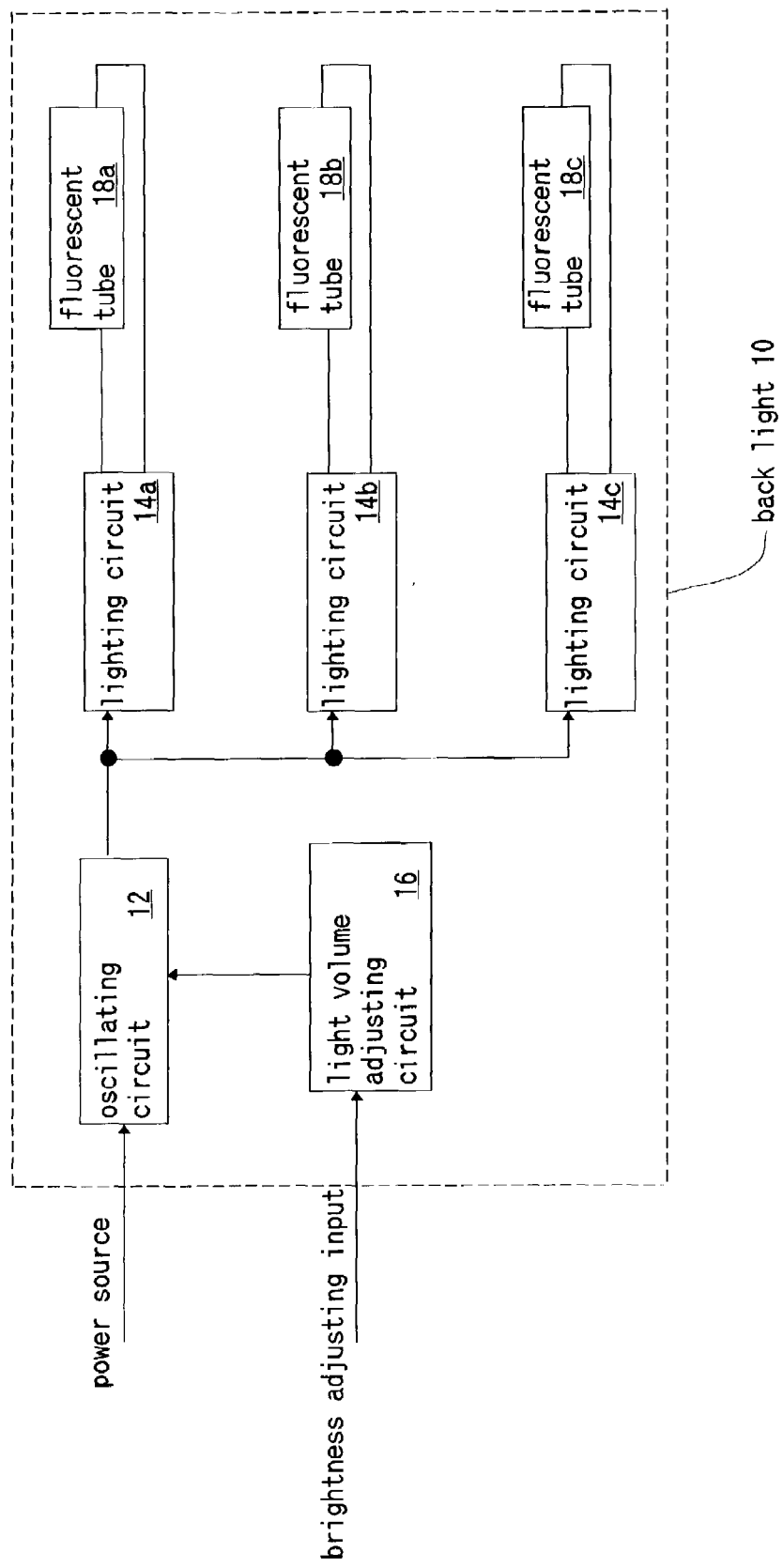
FIG. 1 is a block diagram of the control circuit in a conventional back light.
Figure 2:
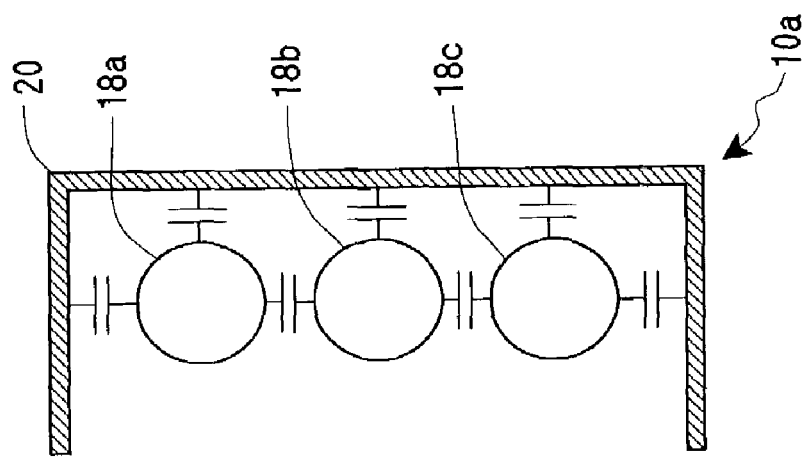
FIG. 2 is an explanatory diagram showing an overview of the structure of a light emitting part in the conventional back light.
Figure 3:
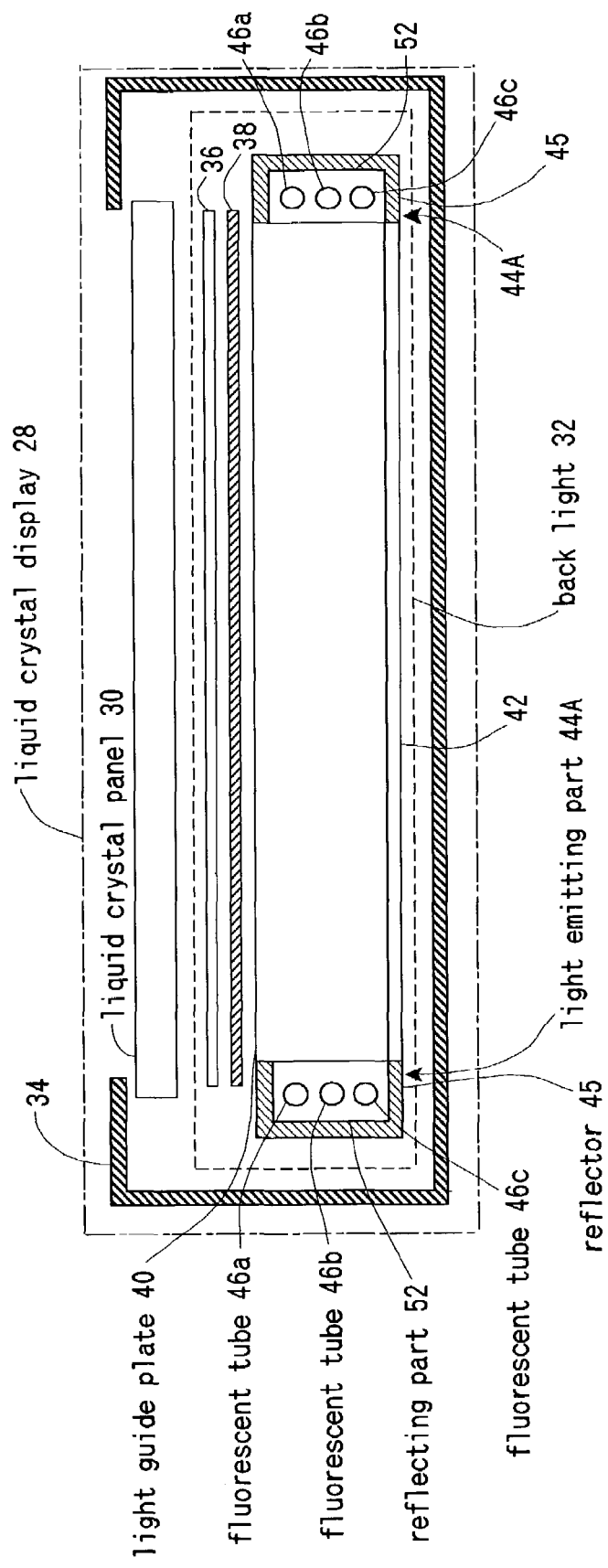
FIG. 3 is a block diagram showing a structure of the liquid crystal display according to a first embodiment of the present invention.

FIG. 3 shows a first embodiment of the liquid crystal display of the present invention. In the diagram, a liquid crystal display 28 includes a liquid crystal panel 30, a back light 32, and a case 34 for accommodating the liquid crystal panel 30 and the back light 32.

The liquid crystal panel 30 has a structure that liquid crystal is sealed between two transparent glass plates which are opposed to each other with a predetermined spacing. The liquid crystal panel 30 is of TN (Twisted Nematic) type, for example. The liquid crystal panel 30 is not limited to TN type but may be of, e.g., VA (Vertically Aligned) type.

Figure 4:
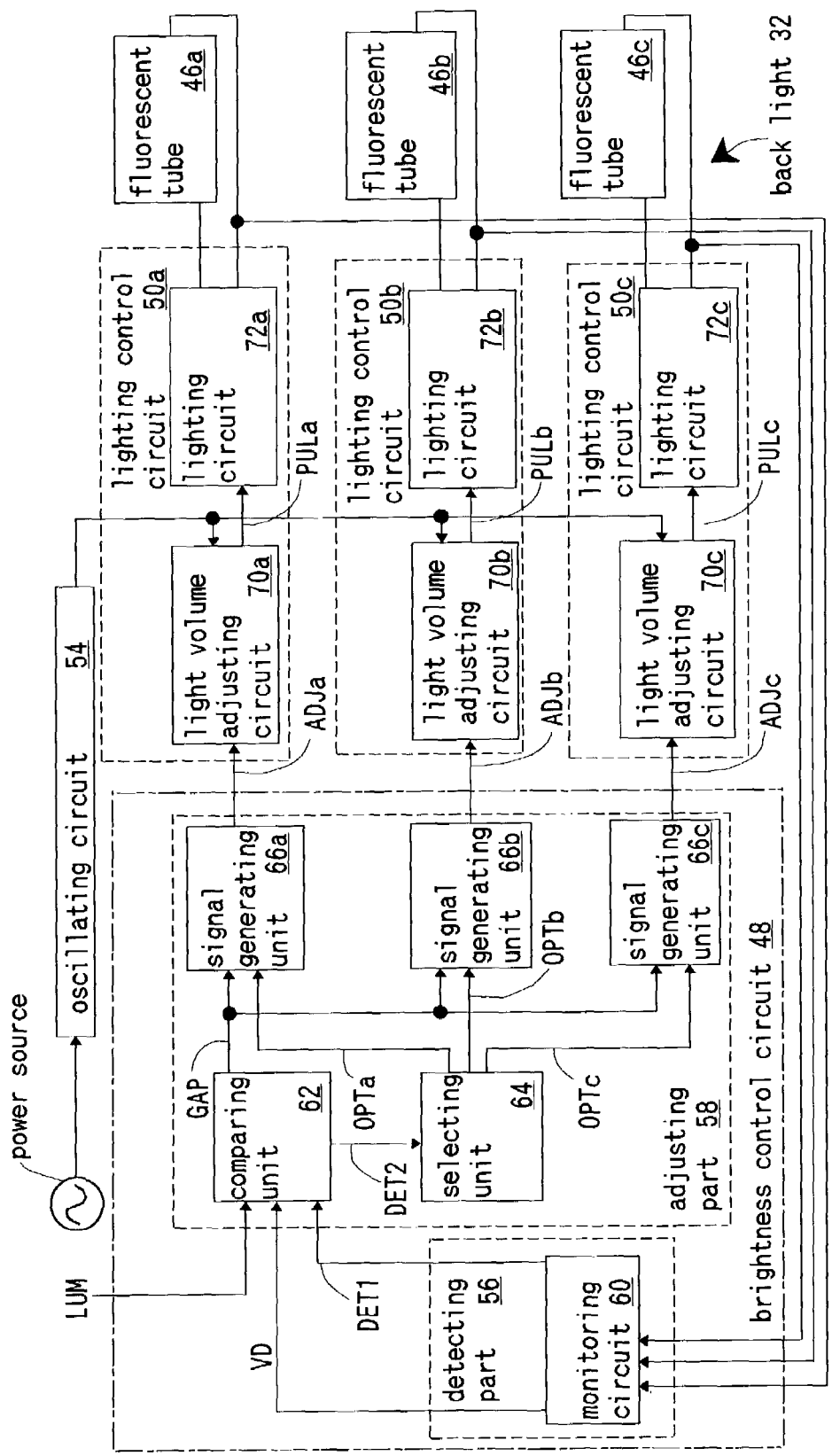
FIG. 4 is a block diagram showing the details of control in the back light of FIG. 3.

The back light 32 includes a prism sheet 36, a diffusion sheet 38, a light guide plate 40 (light pipe), a reflecting sheet 42, and light emitting parts 44A arranged on both sides of the light guide plate 40, respectively, as well as a brightness control circuit 48 and lighting control circuits 50a, 50b, and 50c which are shown in FIG. 4 to be seen later. The light emitting parts 44A contain fluorescent tubes 46a, 46b, and 46c each.

The prism sheet 36 is arranged behind the liquid crystal panel 30. The diffusion sheet 38 is arranged behind the prism sheet 36. The light guide plate 40 is arranged behind the diffusion sheet 38 with its light emitting side toward the diffusion sheet 38. The light guide plate 40 is made of transparent synthetic resin such as acrylic, and has a generally flat shape. The reflecting sheet 42 is arranged on the back of the light guide plate 40.

The light emitting parts 44A have a reflector 45 of U-shaped section. The light emitting parts 44A are arranged with the apertures of the respective reflectors 45 toward sides of the light guide plate 40. The inner surfaces of the reflectors 45 are provided with a reflecting part 52 (reflecting coat) for reflecting light emitted from the fluorescent tubes 46a, 46b, and 46c. Incidentally, the reflectors 45 are not limited to the foregoing configuration. For example, reflectors of semicircular section may be used.

The fluorescent tubes 46a, 46b, and 46c are identical to one another. The fluorescent tubes 46a, 46b, and 46c are arranged at regular intervals in the respective reflectors 45 so as to face the sides of the light guide plate 40. The fluorescent tubes 46a, 46b, and 46c are subjected to voltages from the lighting control circuits 50a, 50b, and 50c to be described later, and light up at luminances corresponding to the waveforms of these voltages. The minimum luminances possible for the fluorescent tubes 46a, 46b, and 46c to light at with stability are approximately 20% the maximum luminances.

In the present embodiment, luminance adjustment control of the fluorescent tubes 46a, 46b, and 46c accommodated in one of the light emitting parts 44A and of the fluorescent tubes 46a, 46b, and 46c accommodated in the other light emitting part 44A are performed in synchronization with each other. For this reason, the following description will exclusively deal with the luminance adjustment control of the fluorescent tubes 46a, 46b, and 46c accommodated in one of the light emitting parts 44A.

FIG. 4 shows the details of control in the back light 32. The back light 32 has the brightness control circuit 48, the lighting control circuits 50a, 50b, and 50c, an oscillating circuit 54, and the fluorescent tubes 46a, 46b, and 46c. The brightness control circuit 48 is composed of a detecting part 56 and an adjusting part 58.

The detecting part 56 includes a monitoring circuit 60. The monitoring circuit 60 detects the currents supplied to the fluorescent tubes 46a, 46b, and 46c, and outputs the luminance of the back light 32 (the total luminance of the fluorescent tubes 46a, 46b, and 46c) determined from the detected currents to the adjusting part 58 as a luminance detecting signal VD. The monitoring circuit 60 outputs a detecting signal DET1 to the adjusting part 58 when it detects that a fluorescent tube (any of 46a, 46b, and 46c) reaches a minimum luminance.

The adjusting part 58 has a comparing unit 62, a selecting unit 64, and signal generating units 66a, 66b, and 66c. The comparing unit 62 receives a luminance adjusting signal LUM for adjusting the luminance of the back light 32 from exterior. The comparing unit 62 also receives the luminance detecting signal VD which indicates the luminance of the back light 32. The comparing unit 62 outputs a gap between the luminance indicated by the luminance adjusting signal LUM and the luminance of the back light 32 indicated by the luminance gap signal GAP. The comparing unit 62 also outputs a detecting signal DET2 to the selecting unit 64 in synchronization with the detecting signal DET1.

The selecting unit 64 outputs any one of selecting signals OPTa, OPTb, and OPTc all the time (always keeps any one of them at high level). The selecting signal OPTa is output to the signal generating unit 66a. The selecting signal OPTb is output to the signal generating unit 66b. The selecting signal OPTc is output to the signal generating unit 66c.

The selecting unit 64 outputs the selecting signal OPTa when the back light 32 is at the maximum in luminance. Upon receiving the detecting signal DET2 while outputting the selecting signal OPTa, the selecting unit 64 stops outputting the selecting signal OPTa (turns the selecting signal OPTa to low level) in synchronization with the reception and outputs the selecting signal OPTb (turns the selecting signal OPTb to high level). Upon receiving the detecting signal DET2 while outputting the selecting signal OPTb, the selecting unit 64 stops outputting the selecting signal OPTb (turns the selecting signal OPTb to low level) in synchronization with the reception and outputs the selecting signal OPTc (turns the selecting signal OPTc to high level). Upon receiving the detecting signal DET2 while outputting the selecting signal OPTc, the selecting unit 64 keeps outputting the selecting signal OPTc without any change in output.

The signal generating unit 66a, while receiving the selecting signal OPTa of high level, operates to adjust the fluorescent tube 46a in luminance. More specifically, the signal generating unit 66a outputs, to the lighting control circuit 50a, a light volume adjusting signal ADJa for adjusting the luminance of the fluorescent tube 46a so that the luminance gap signal GAP decreases. Moreover, in synchronization with the falling edge of the selecting signal OPTa, the signal generating unit 66a fixes the light volume adjusting signal ADJa to a turn-off level for turning off the fluorescent tube 46a.

The signal generating unit 66b, while receiving the selecting signal OPTb of high level, operates to adjust the fluorescent tube 46b in luminance. More specifically, the signal generating unit 66b outputs, to the lighting control circuit 50b, a light volume adjusting signal ADJb for adjusting the luminance of the fluorescent tube 46b so that the luminance gap signal GAP decreases. Moreover, in synchronization with the falling edge of the selecting signal OPTb, the signal generating unit 66b fixes the light volume adjusting signal ADJb to a turn-off level for turning off the fluorescent tube 46b.

The signal generating unit 66c, while receiving the selecting signal OPTc of high level, operates to adjust the fluorescent tube 46c in luminance. More specifically, the signal generating unit 66c outputs, to the lighting control circuit 50c, a light volume adjusting signal ADJc for adjusting the luminance of the fluorescent tube 46c so that the luminance gap signal GAP decreases.

The signal generating units 66a, 66b, and 66c fix the output of the respective light volume adjusting signals ADJa, ADJb, and ADJc unless receiving the selecting signals OPTa, OPTb, and OPTc (while the selecting signals OPTa, OPTb, and OPTc are at low level).

Now, the light volume adjusting signal ADJb to be output from the signal generating unit 66b is set to be relatively smaller than the light volume adjusting signal ADJa and the light volume adjusting signal ADJc. On this account, the effective voltage that the lighting control circuit 50b applies to the fluorescent tube 46b is relatively lower than the effective voltage that the lighting control circuit 50a applies to the fluorescent tube 46a and the effective voltage that the lighting control circuit 50 applies to the fluorescent tube 46c.

To put it in details, the fluorescent tube 46b arranged in the center of the reflector 45 shown in FIG. 3 faces a smaller area of the reflecting part 52 than the outer fluorescent tubes 46a and 46c do. That is, the parasitic capacitance occurring between the fluorescent tube 46b and the reflector 45 is smaller than the parasitic capacitance occurring between the fluorescent tube 46a and the reflector 45 and the parasitic capacitance occurring between the fluorescent tube 46c and the reflector 45. This makes the leakage current from the fluorescent tube 46b to the reflector 45 smaller than the leakage currents from the fluorescent tubes 46a and 46c to the reflector 45. When the effective voltage to be applied to the fluorescent tube 46b is made relatively lower than the effective voltages to be applied to the fluorescent tubes 46a and 46c as mentioned above, the current supplied to the fluorescent tube 46b becomes smaller than the currents supplied to the fluorescent tubes 46a and 46c. Here, the current leaking from the fluorescent tube 46b of smaller parasitic capacitance to the reflector 45 is smaller than the currents leaking from the fluorescent tubes 46a and 46c. Then, the fluorescent tubes 46a, 46b, and 46c turn out to be identical in the current that contributes to light emission.

The lighting control circuit 50a is formed for the fluorescent tube 46a, and has a light volume adjusting circuit 70a and a lighting circuit 72a. The lighting control circuit 50b is formed for the fluorescent tube 46b, and has a light volume adjusting circuit 70b and a lighting circuit 72b. The lighting control circuit 50c is formed for the fluorescent tube 46c, and has a light volume adjusting circuit 70c and a lighting circuit 72c.

The light volume adjusting circuits 70a, 70b, and 70c are supplied with an alternating voltage from the oscillating circuit 54. The light volume adjusting circuit 70a receives the light volume adjusting signal ADJa, adjusts the alternating voltage in amplitude according to the luminance indicated by the light volume adjusting signal ADJa, and outputs the adjusted alternating voltage to the lighting circuit 72a. The light volume adjusting circuit 70b receives the light volume adjusting signal ADJb, adjusts the alternating voltage in amplitude according to the luminance indicated by the light volume adjusting signal ADJb, and outputs the adjusted alternating voltage to the lighting circuit 72b. The light volume adjusting circuit 70c receives the light volume adjusting signal ADJc, adjusts the alternating voltage in amplitude according to the luminance indicated by the light volume adjusting signal ADJc, and outputs the adjusted alternating voltage to the lighting circuit 72c.

Each of the lighting circuits 72a, 72b, and 72c boosts the alternating voltage supplied from the light volume adjusting circuit and applies the boosted voltage to the corresponding fluorescent tube (any of 46a, 46b, and 46c).

Incidentally, in the present embodiment, the alternative voltages are adjusted in amplitude (effective value) to adjust the luminances of the respective fluorescent tubes 46a, 46b, and 46c. Otherwise, the alternative voltages to be applied to the fluorescent tubes may be adjusted in period (duty ratio control) to adjust the luminances of the respective fluorescent tubes.

Now, description will be given of the luminance adjustment of the back light 32 described above.

Figure 5:
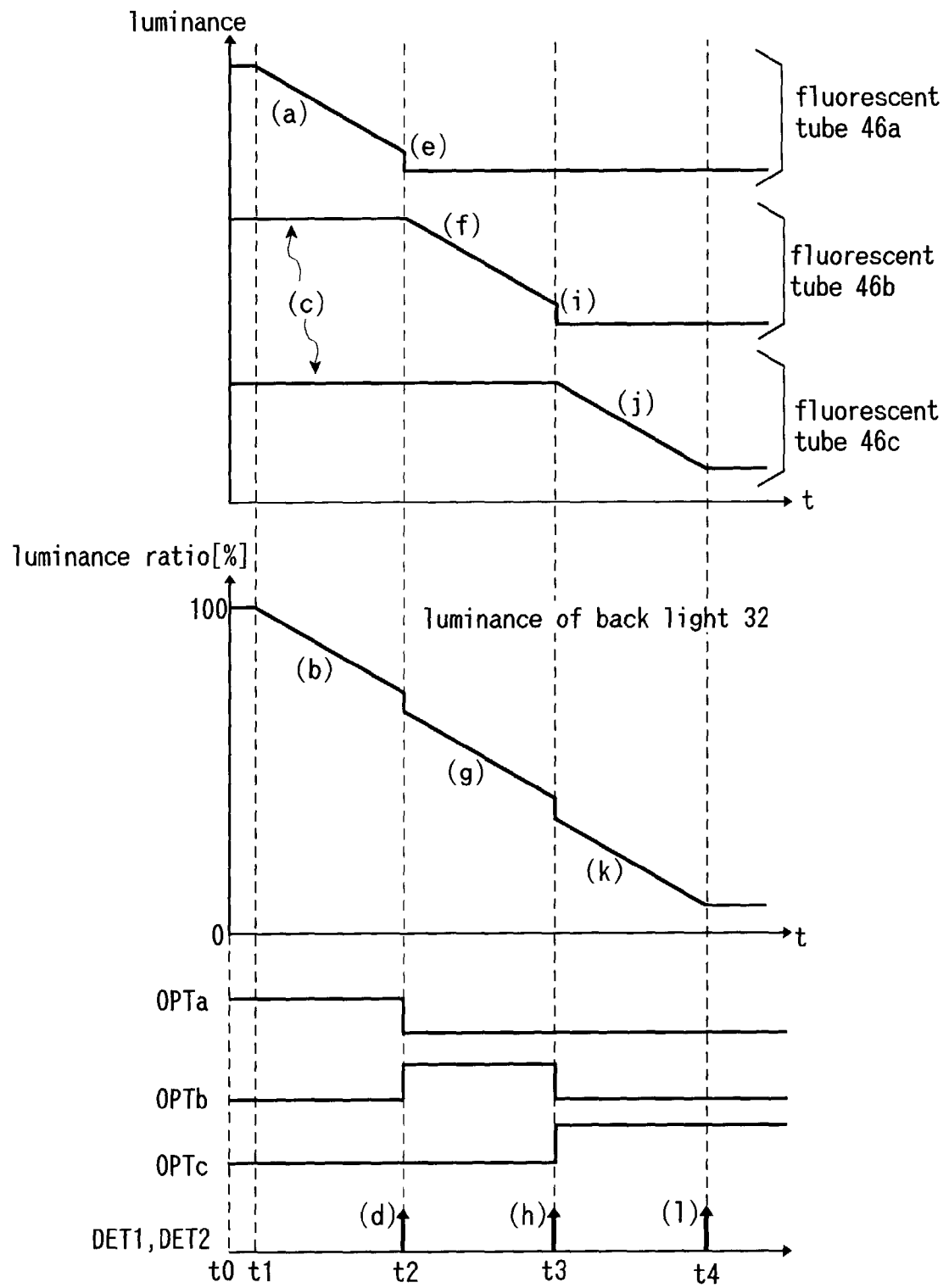
FIG. 5 is an explanatory diagram showing luminance variations of the individual fluorescent tubes and the back light of the first embodiment.

FIG. 5 shows luminance variations of the fluorescent tubes 46a, 46b, and 46c, and the back light 32. In this example, in an initial state (at time t0), the signal generating units 66a, 66b, and 66c shown in FIG. 4 output light volume adjusting signals ADJa, ADJb, and ADJc for lighting the corresponding fluorescent tubes 46a, 46b, and 46c at the maximum luminances, respectively. The selecting unit 64 outputs the selecting signal OPTa to select the signal generating unit 66a. The fluorescent tubes 46a, 46b, and 46c are lit at their respective maximum luminances. That is, at time t0, the back light 32 is at the maximum in luminance.

In this example, the comparing unit 62 receives, at time t1, a luminance adjusting signal LUM indicating that the back light 32 is to be minimized in luminance. Here, the luminance indicated by the luminance adjusting signal LUM is smaller than the luminance indicated by the luminance detecting signal VD. The comparing unit 62 thus outputs a luminance gap signal GAP for lowering the luminance of the back light. The signal generating unit 66a is in a luminance adjustable state, receiving the selecting signal OPTa of high level. The signal generating unit 66a outputs to the light volume adjusting circuit 70a a light volume adjusting signal ADJa for lowering the luminance of the fluorescent tube 46a (luminance-down operation).

Consequently, the fluorescent tube 46a gradually decreases in luminance (FIG. 5(a)). With the decreasing luminance of the fluorescent tube 46a, the back light 32 also decreases in luminance (FIG. 5(b)). Since the output of the signal generating units 66b and 66c is fixed, the fluorescent tubes 46b and 46c have no change in luminance (FIG. 5(c)).

At time t2, the luminance of the fluorescent tube 46a reaches the minimum luminance, and the detecting part 56 outputs the detecting signal DET1 (FIG. 5(d)). In synchronization with the reception of the detecting signal DET1, the comparing unit 62 outputs the detecting signal DET2 (FIG. 5(d)). In response to the detecting signal DET2, the selecting unit 64 turns the selecting signal OPTa to low level and turns the selecting signal OPTb to high level. In synchronization with the falling edge of the selecting signal OPTa, the signal generating unit 66a fixes the light volume adjusting signal ADJa to the turn-off level for turning off the fluorescent tube 46a (turn-off operation). Then, the fluorescent tube 46a goes out (FIG. 5(e)). The signal generating unit 66b receives the selecting signal OPTb of high level and enters a luminance adjustable state. The signal generating unit 66b outputs to the light volume adjusting circuit 70b a light volume adjusting signal ADJb for lowering the luminance of the fluorescent tube 46b (luminance-down operation). Consequently, the fluorescent tube 46b decreases in luminance (FIG. 5(f)). With the decreasing luminance of the fluorescent tube 46b, the back light 32 also decreases in luminance (FIG. 5(g)).

At time t3, the luminance of the fluorescent tube 46b reaches the minimum luminance, and the detecting part 56 outputs the detecting signal DET1 (FIG. 5(h)). In synchronization with the detecting signal DET1, the comparing unit 62 outputs the detecting signal DET2 (FIG. 5(h)). In response to the detecting signal DET2, the selecting unit 64 turns the selecting signal OPTb to low level and turns the selecting signal OPTc to high level. In synchronization with the falling edge of the selecting signal OPTb, the signal generating unit 66b fixes the light volume adjusting signal ADJb to the turn-off level for turning off the fluorescent tube 46b (turn-off operation). Then, the fluorescent tube 46b goes out (FIG. 5(i)). The signal generating unit 66c receives the selecting signal OPTc of high level and enters a luminance adjustable state. The signal generating unit 66c outputs to the light volume adjusting circuit 70c a light volume adjusting signal ADJc for lowering the luminance of the fluorescent tube 46c (luminance-down operation). Consequently, the fluorescent tube 46c decreases in luminance (FIG. 5(j)). With the decreasing luminance of the fluorescent tube 46c, the back light 32 also decreases in luminance (FIG. 5(k)).

At time t4, the luminance of the fluorescent tube 46c reaches the minimum luminance, and the detecting part 56 outputs the detecting signal DET1 (FIG. 5(l)). In synchronization with the detecting signal DET1, the comparing unit 62 outputs the detecting signal DET2 (FIG. 5(l)). Fluorescent tubes lit here are the fluorescent tube 46c alone. That is, at time t4, the back light 32 becomes minimum in luminance. Here, the luminance indicated by the luminance detecting signal VD becomes equal to the luminance indicated by the luminance adjusting signal LUM, and the comparing unit 62 outputs a luminance gap signal GAP of 0 in magnitude. When the fluorescent tube 46c lit to the end becomes minimum in luminance, the brightness control circuit 48 makes no turn-off operation and keeps the fluorescent tube 46c lit at the minimum luminance.

In a case where the fluorescent tubes 46a, 46b, and 46c are lit at their maximum luminances, the luminance of the back light 32 is maximum. Also, when only a single fluorescent tube (46c, in this example) in each light emitting part 44A is lit at its minimum luminance, the luminance of the back light 32 is minimum. Hence, the minimum luminance of the back light 32 is one-third that of conventional back lights in which all the fluorescent tubes are lit together at their minimum luminances.

As has been described, according to the present embodiment, the adjusting part 58 has only to receive the detecting signal DET1 to easily detect that any one of the fluorescent tubes 46a, 46b, and 46c reaches its minimum luminance. Thus, the adjusting part 58 can easily switch the fluorescent tube to adjust (any one of 46a, 46b, and 46c). This can facilitate the control in lowering the luminance of the back light 32.

Since the detecting part 56 directly detects the currents supplied to the fluorescent tubes 46a, 46b, and 46c by using the monitoring circuit 60, it can easily detect that any one of the fluorescent tubes 46a, 46b, and 46c reaches the minimum luminance.

The fluorescent tube 46b, which causes a smaller parasitic capacitance with the reflector 45, is subjected to an effective voltage relatively lower than the effective voltages applied to the other fluorescent tubes 46a and 46c. This can make the florescent tubes 46a, 46b, and 46c identical in the current that contributes to light emission. The fluorescent tubes 46a, 46b, and 46c can thus be made identical in life. The result is that the fluorescent tube 46b, causing a smaller parasitic capacitance with the reflector 45, is prolonged in life, allowing extended life of the back light 32.

Figure 6:
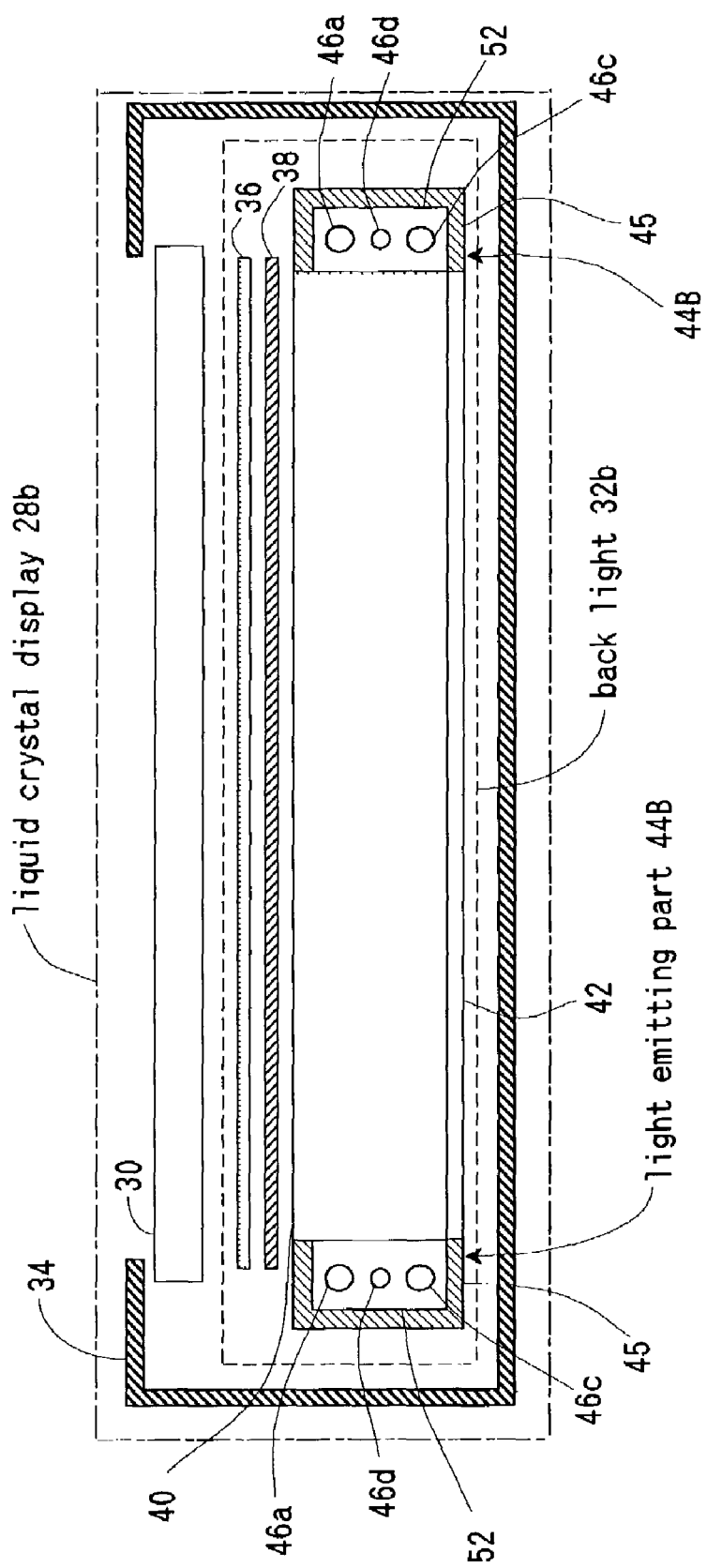
FIG. 6 is a block diagram showing a structure of the liquid crystal display according to a second embodiment of the present invention.

FIG. 6 shows a second embodiment of the liquid crystal display of the present invention. The same elements as those of the first embodiment will be designated by identical reference numbers or symbols. Detailed description will be omitted of these elements. A liquid crystal display 28b includes a liquid crystal panel 30, a back light 32b, and a case 34 for accommodating the liquid crystal panel 30 and the back light 32b.

The back light 32b includes a prism sheet 36, a diffusion sheet 38, a light guide plate 40, a reflecting sheet 42, light emitting parts 44B arranged on both sides of the light guide plate 40, a brightness control circuit 48b, and lighting control circuits 50a, 50b, and 50c which are shown in FIG. 5 and to be described later.

The back light 32b has the same configuration as that of the first embodiment except that the diameters of fluorescent tubes 46d arranged in the centers of reflectors 45 of the light emitting parts 44B are smaller than those of fluorescent tubes 46a and 46c arranged on both sides of the respective fluorescent tubes 46d, and that signal generating units 66d and 66e (shown in FIG. 7 to be seen later) are formed instead of the signal generating units 66b and 66c of the first embodiment.

The fluorescent tubes 46d are smaller in diameter than the fluorescent tubes 46a and 46c, and thus are higher in impedance than the fluorescent tubes 46a and 46c. Accordingly, given that the same effective voltage is applied to all the fluorescent tubes 46a, 46d, and 46c, the currents supplied to the fluorescent tubes 46d of higher impedance become smaller than the currents supplied to the other fluorescent tubes 46a and 46c. Moreover, as in the first embodiment, the fluorescent tubes 46d arranged in the centers of the reflectors 45 are less prone to leak currents to the reflectors 45 than the fluorescent tubes 46a and 46c do. Consequently, the currents leaking from the fluorescent tubes 46d of higher impedance to the reflector 45 become smaller than the currents leaking from the fluorescent tubes 46a and 46c. Then, the fluorescent tubes 46a, 46d, and 46c turn out to be identical in the current that contributes to light emission. Thus, as in the first embodiment, the fluorescent tubes 46a, 46d, and 46c become identical in life.

In the present embodiment, the lighting control circuits 50a, 50b, and 50c shown in FIG. 5 to be seen later apply relatively the same effective voltages to the respective fluorescent tubes 46a, 46d, and 46c.

Now, in the present embodiment, luminance adjustment control of the fluorescent tubes 46a, 46d, and 46c accommodated in one of the light emitting parts 44B and luminance adjustment control of the fluorescent tubes 46a, 46d, and 46c accommodated in the other light emitting part 44B are performed in synchronization with each other. For this reason, the following description will exclusively deal with the luminance adjustment control of the fluorescent tubes 46a, 46d, and 46c accommodated in one of the light emitting parts 44B.

Figure 7:
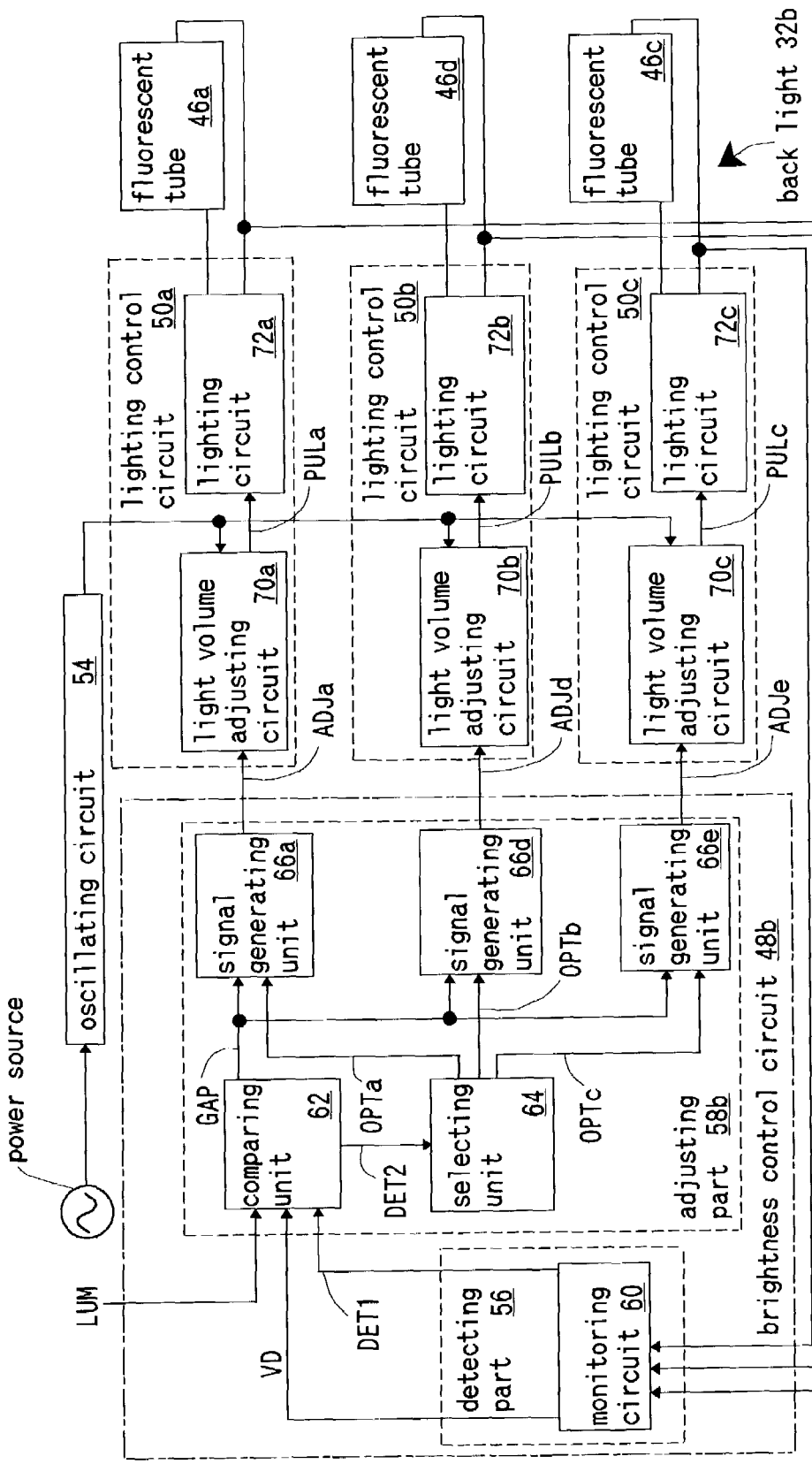
FIG. 7 is a block diagram showing the details of control in the back light of FIG. 6.

FIG. 7 shows the details of control of the back light 32b.

The signal generating unit 66d receives a luminance gap signal GAP and a selecting signal OPTb, and outputs to the lighting control circuit 50b a light volume adjusting signal ADJd for adjusting the luminance of the fluorescent tube 46d. In response to the rising edge of the selecting signal OPTb, the signal generating unit 66d enhances the light volume adjusting signal ADJd steeply so that the fluorescent tube 46d increases in luminance as much as the minimum luminance of the fluorescent tube 46a. Subsequently, while receiving the selecting signal OPTb of high level, the signal generating unit 66d outputs to the lighting control circuit 50b a light volume adjusting signal ADJd for adjusting the luminance of the fluorescent tube 46d so that the luminance gap signal GAP decreases. Besides, in synchronization with the falling edge of the selecting signal OPTb, the signal generating unit 66d fixes the light volume adjusting signal ADJd to a turn-off level for turning off the fluorescent tube 46d.

The signal generating unit 66e receives the luminance gap signal GAP and a selecting signal OPTc, and outputs to the lighting control circuit 50c a light volume adjusting signal ADJe for adjusting the luminance of the fluorescent tube 46c. In response to the rising edge of the selecting signal OPTc, the signal generating unit 66e enhances the light volume adjusting signal ADJe steeply so that the fluorescent tube 46c increases in luminance as much as the minimum luminance of the fluorescent tube 46d. Subsequently, while receiving the selecting signal OPTc of high level, the signal generating unit 66e outputs to the lighting control circuit 50c a light volume adjusting signal ADJe for adjusting the luminance of the fluorescent tube 46c so that the luminance gap signal GAP decreases.

Incidentally, the signal generating units 66d and 66e fix the output of the light volume adjusting signals ADJd and ADJe while the selecting signals OPTb and OPTc are at low level.

Now, description will be given of the luminance adjustment of the back light 32b described above.

Figure 8:
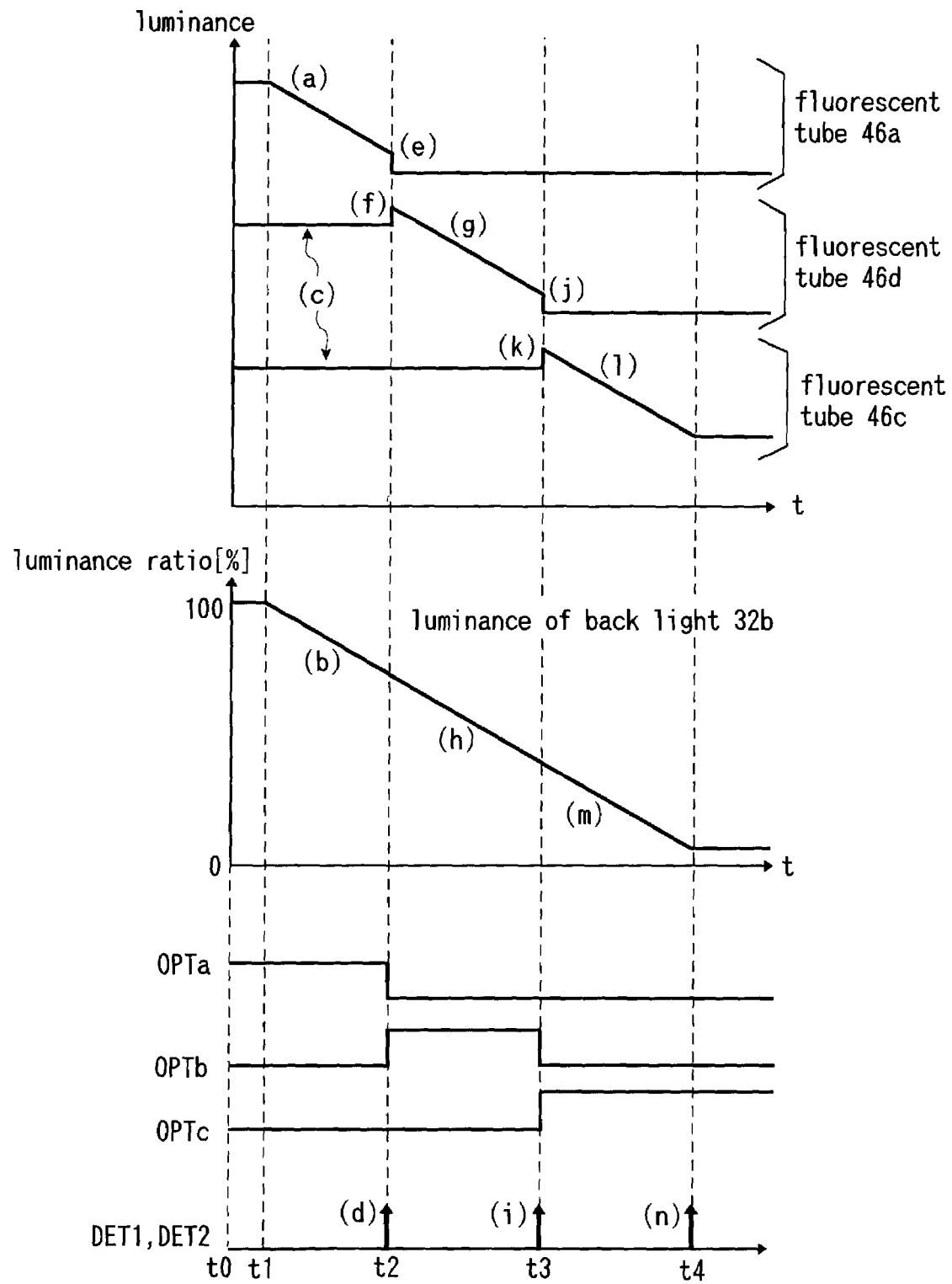
FIG. 8 is an explanatory diagram showing luminance variations of the individual fluorescent tubes and the back light of the second embodiment.

FIG. 8 shows luminance variations of the fluorescent tubes 46a, 46d, and 46c, and the back light 32b. In this example, as with the first embodiment, the fluorescent tubes 46a, 46d, and 46c are lit at their respective maximum luminances in an initial state (at time t0). In addition, the selecting unit 64 outputs the selecting signal OPTa of high level and keeps the selecting signals OPTb and OPTc at low level.

At time t1, a luminance adjusting signal LUM indicating that the back light 32b is to be minimized in luminance is supplied, in which case the fluorescent tube 46a gradually decreases in luminance (FIG. 8(a)). With the decreasing luminance of the fluorescent tube 46a, the back light 32b also decreases in luminance (FIG. 8(b)). Since the output of the signal generating units 66d and 66e is fixed, the fluorescent tubes 46d and 46c have no change in luminance (FIG. 8(c)).

At time t2, the luminance of the fluorescent tube 46a reaches the minimum luminance, and the detecting part 56 outputs the detecting signal DET1 (FIG. 8(d)). In synchronization with the detecting signal DET1, the comparing unit 62 outputs the detecting signal DET2 (FIG. 8(d)). In response to the detecting signal DET2, the selecting unit 64 turns the selecting signal OPTa to low level and turns the selecting signal OPTb to high level. In synchronization with the falling edge of the selecting signal OPTa, the signal generating unit 66a fixes the light volume adjusting signal ADJa to the turn-off level for turning off the fluorescent tube 46a (turn-off operation). Then, the fluorescent tube 46a goes out (FIG. 8(e)). In response to the rising edge of the selecting signal OPTb, the signal generating unit 66d enhances the light volume adjusting signal ADJd steeply so that the fluorescent tube 46d increases in luminance as much as the minimum luminance of the fluorescent tube 46a (FIG. 8(f)). This prevents the back light 32b from dropping in luminance due to the turning-off of the fluorescent tube 46a. That is, the back light 32b makes little variation in luminance when the fluorescent tube 46a is turned off.

Subsequently, while receiving the selecting signal OPTb of high level, the signal generating unit 66d outputs to the lighting control circuit 50b a light volume adjusting signal ADJd for adjusting the luminance of the fluorescent tube 46d so that the luminance gap signal GAP decreases. Consequently, the fluorescent tube 46d decreases in luminance (FIG. 8(g)). With the decreasing luminance of the fluorescent tube 46d, the back light 32b also decreases in luminance (FIG. 8(h)).

At time t3, the luminance of the fluorescent tube 46d reaches the minimum luminance, and the detecting part 56 outputs the detecting signal DET1 (FIG. 8(i)). In synchronization with the detecting signal DET1, the comparing unit 62 outputs the detecting signal DET2 (FIG. 8(i)). In response to the detecting signal DET2, the selecting unit 64 turns the selecting signal OPTb to low level and turns the selecting signal OPTc to high level. In synchronization with the falling edge of the selecting signal OPTb, the signal generating unit 66d fixes the light volume adjusting signal ADJd to the turn-off level for turning off the fluorescent tube 46d (turn-off operation). Then, the fluorescent tube 46d goes out (FIG. 8(j)). In response to the rising edge of the selecting signal OPTc, the signal generating unit 66e enhances the light volume adjusting signal ADJe steeply so that the fluorescent tube 46c increases in luminance as much as the minimum luminance of the fluorescent tube 46d (FIG. 8(k)). This prevents the back light 32b from dropping in luminance due to the turning-off of the fluorescent tube 46d. That is, the back light 32b makes little variation in luminance when the fluorescent tube 46d is turned off.

Subsequently, while receiving the selecting signal OPTc of high level, the signal generating unit 66e outputs to the lighting control circuit 50c a light volume adjusting signal ADJe for adjusting the luminance of the fluorescent tube 46c so that the luminance gap signal GAP decreases. Consequently, the fluorescent tube 46c decreases in luminance (FIG. 8(l)). With the decreasing luminance of the fluorescent tube 46c, the back light 32b also decreases in luminance (FIG. 8(m)).

At time t4, the luminance of the fluorescent tube 46c reaches the minimum luminance, and the detecting part 56 outputs the detecting signal DET1 (FIG. 8(n)). In synchronization with the detecting signal DET1, the comparing unit 62 outputs the detecting signal DET2 (FIG. 8(n)). Here, the back light 32b is at the minimum in luminance, so that the luminance indicated by the luminance detecting signal VD and the luminance indicated by the luminance adjusting signal LUM become equal. Then, the comparing unit 62 outputs a luminance gap signal GAP of 0 in magnitude. When the fluorescent tube 46c lit to the end becomes minimum in luminance, the brightness control circuit 48b makes no turn-off operation and keeps the fluorescent tube 46c lit at the minimum luminance.

As has been described, the liquid crystal display 28b of the present embodiment can offer the same effects as those of the foregoing first embodiment. Besides, in the present embodiment, the adjusting part 58b enhances the luminances of the fluorescent tubes 46d and 46c steeply in turning off the fluorescent tubes 46a and 46d, respectively. The back light 32b can thus be prevented from changing in luminance due to the turning-off of the fluorescent tubes 46a and 46d that are lit at the minimum luminances.

The fluorescent tubes 46d arranged in the centers of the reflectors 45 have a diameter smaller than the diameter of the outer fluorescent tubes 46a and 46c. Hence, the fluorescent tubes 46d of smaller parasitic capacitance can be increased in impedance. Consequently, even if relatively the same effective voltages are applied to all the fluorescent tubes 46a, 46d, and 46c, the fluorescent tubes 46a, 46d, and 46c can be made identical in the current that contributes to light emission. As a result, the fluorescent tubes 46a, 46d, and 46c can be made identical in life, allowing extended life of the back light 32b.

In addition, since relatively the same effective voltages may be applied to the fluorescent tubes 46a, 46d, and 46c, the signal generating units 66a, 66d, and 66e can be made common in circuitry.

Figure 9:
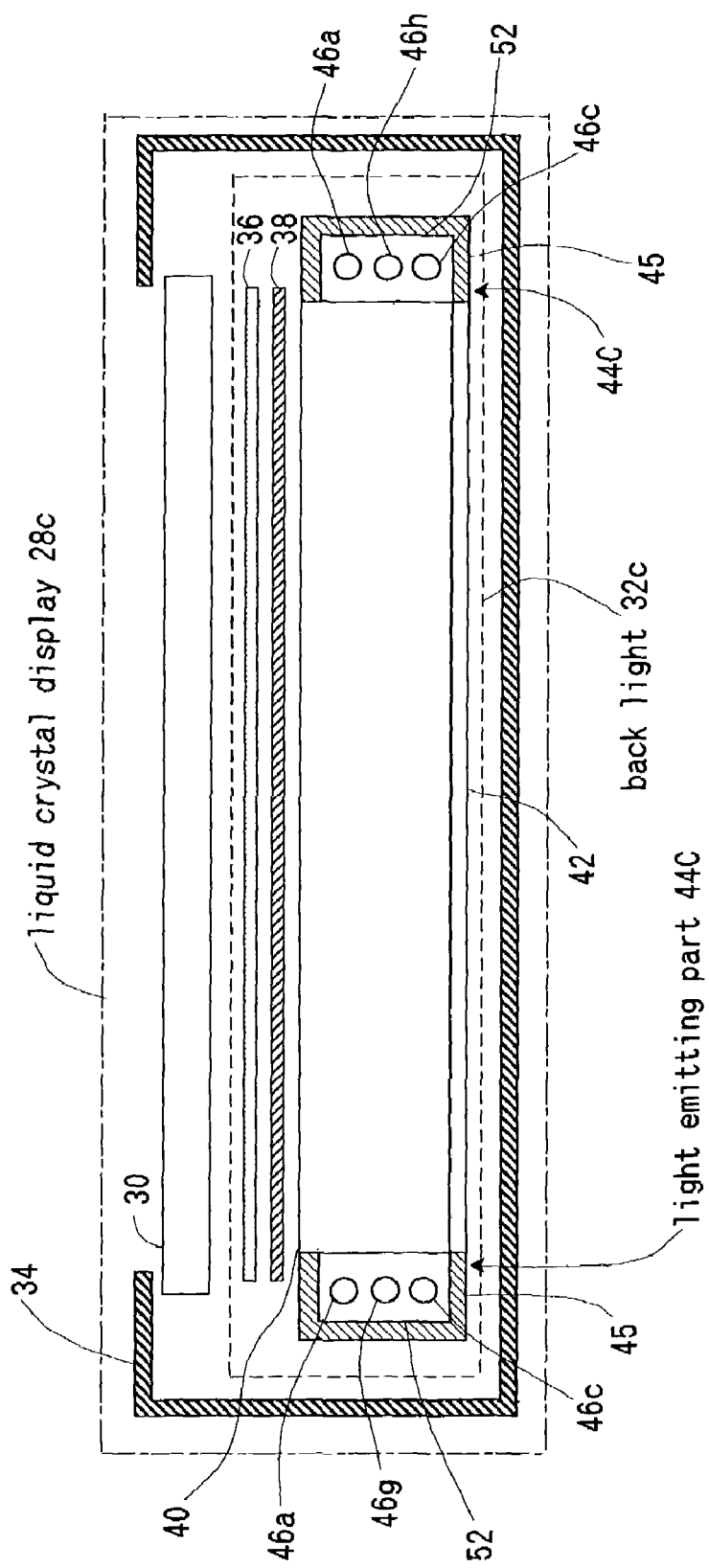
FIG. 9 is a block diagram showing a structure of the liquid crystal display according to a third embodiment of the present invention.

FIG. 9 shows a third embodiment of the liquid crystal display of the present invention. The same elements as those of the first and second embodiments will be designated by identical reference numbers or symbols. Detailed description will be omitted of these elements. A liquid crystal display 28c includes a liquid crystal panel 30, a back light 32c, and a case 34 for accommodating the liquid crystal panel 30 and the back light 32c.

The back light 32c includes a prism sheet 36, a diffusion sheet 38, a light guide plate 40, a reflecting sheet 42, and light emitting parts 44C arranged on both sides of the light guide plate 40, respectively.

The light emitting parts 44C have a reflector 45 each. The light emitting part 44C on the right of the light guide plate 40 in FIG. 9 accommodates fluorescent tubes 46a, 46g, and 46c. The light emitting part 44C on the left of the light guide plate 40 in FIG. 9 accommodates fluorescent tubes 46a, 46h, and 46c.

The fluorescent tube 46g and the fluorescent tube 46h are identical to each other. The fluorescent tubes 46g and 46h are arranged in the centers of the respective reflectors 45. All the minimum luminances and maximum luminances possible for the respective fluorescent tubes 46a, 46g, 46h, and 46c to light at with stability are approximately the same.

The fluorescent tubes 46g and 46h have an internal gas pressure higher than that of the fluorescent tubes 46a and 46c. On this account, the fluorescent tubes 46g and 46h are higher in impedance than the fluorescent tubes 46a and 46c. Moreover, the fluorescent tubes 46g and 46h, arranged in the centers of the reflectors 45, cause smaller parasitic capacitances with the reflectors 45 as in the second embodiment.

Thus, the fluorescent tubes 46g and 46h are less prone to leak currents to the reflectors 45 than the fluorescent tubes 46a and 46c do.

Consequently, as in the second embodiment, the fluorescent tubes 46a, 46g, 46h, and 46c become identical in the current that contributes to light emission, provided that the same effective voltage is applied to all the fluorescent tubes 46a, 46g, 46h, and 46c. The result is that the fluorescent tubes 46a, 46g, 46h, and 46c become identical in life as with the first embodiment.

Figure 10:
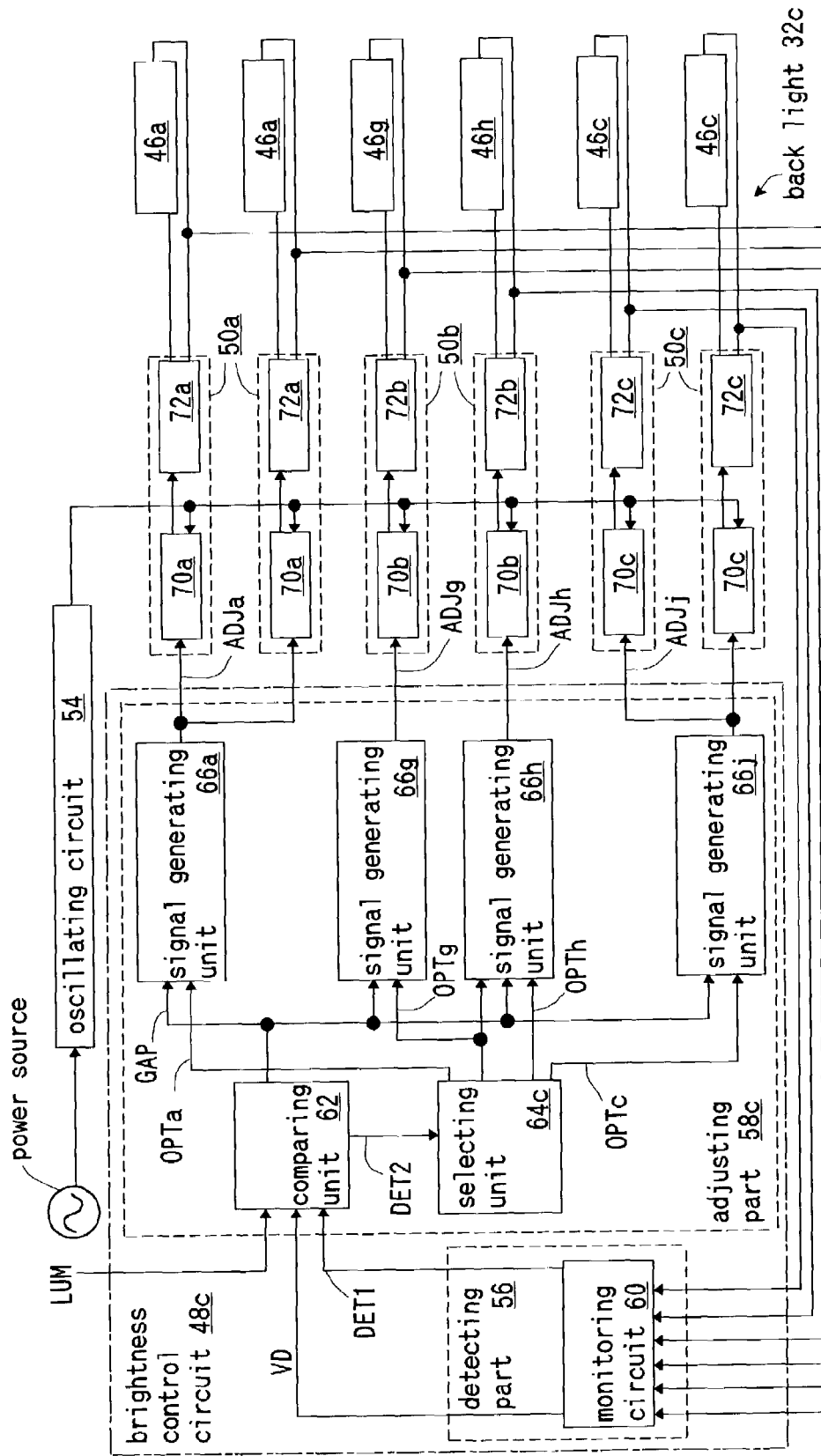
FIG. 10 is a block diagram showing the details of control in the back light of FIG. 9.

FIG. 10 shows the details of control of the back light 32c. The back light 32c has a brightness control circuit 48c, two lighting control circuits 50a corresponding to the fluorescent tubes 46a, respectively, two lighting control circuits 50b corresponding to the fluorescent tubes 46g and 46h, respectively, two lighting control circuits 50c corresponding to the fluorescent tubes 46c, respectively, and an oscillating circuit 54.

The lighting control circuits 50a, 50b, and 50c apply relatively the same effective voltages to the fluorescent tubes 46a, 46g, 46h, and 46c.

The brightness control circuit 48c is composed of a detecting part 56 and an adjusting part 58c. The adjusting part 58c has a comparing unit 62, a selecting unit 64c, and signal generating units 66a, 66g, 66h, and 66j.

The selecting unit 64c always outputs (keeps at high level) at least any one of selecting signals OPTa, OPTg, OPTh, and OPTc. The selecting signal OPTa is output to the signal generating unit 66a. The selecting signal OPTg is output to the signal generating unit 66g and the signal generating unit 66h. The selecting signal OPTh is output to the signal generating unit 66h. The selecting signal OPTc is output to the signal generating unit 66j.

Now, description will be given of the luminance adjustment of the back light 32c described above.

Figure 11:
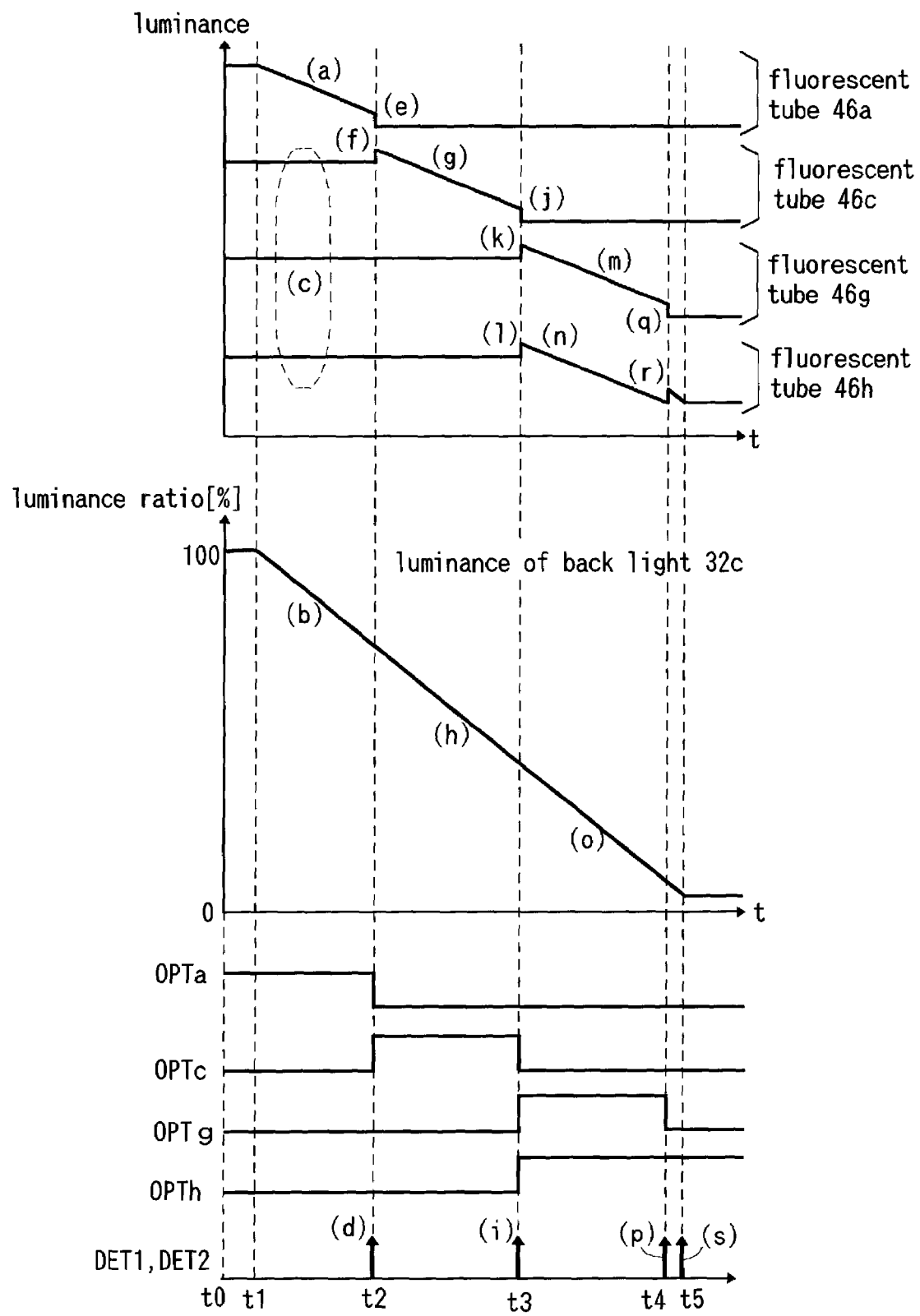
FIG. 11 is an explanatory diagram showing luminance variations of the individual fluorescent tubes and the back light of the third embodiment.

FIG. 11 shows luminance variations of the fluorescent tubes 46a, 46g, 46h, and 46c, and the back light 32c. In this example, as with the first embodiment, the fluorescent tubes 46a, 46g, 46h, and 46c are lit at their respective maximum luminances in an initial state (at time t0). Besides, the selecting unit 64c outputs the selecting signal OPTa (keeps the selecting signal OPTa at high level).

At time t1, a luminance adjusting signal LUM indicating that the back light 32c is to be minimized in luminance is supplied, in which case the two fluorescent tube 46a gradually decrease in luminance (FIG. 11(a)). With the decreasing luminances of the fluorescent tubes 46a, the back light 32c also decreases in luminance (FIG. 11(b)). Since the output of the signal generating units 66g, 66h, and 66j is fixed, the fluorescent tubes 46g, 46h, and 46c have no change in luminance (FIG. 11(c)).

At time t2, the luminances of the fluorescent tubes 46a reach the minimum luminances, and the detecting part 56 outputs the detecting signal DET1 (FIG. 11(d)). In synchronization therewith, the comparing unit 62 outputs the detecting signal DET2 (FIG. 11(d)). In response to the detecting signal DET2, the selecting unit 64c turns the selecting signal OPTa to low level and turns the selecting signal OPTc to high level. In synchronization with the falling edge of the selecting signal OPTa, the signal generating unit 66a fixes the light volume adjusting signal ADJa to a turn-off level for turning off the fluorescent tubes 46a (turn-off operation). Then, the two fluorescent tubes 46a go out (FIG. 11(e)). In response to the rising edge of the selecting signal OPTc, the signal generating unit 66j enhances a light volume adjusting signal ADJj steeply so that the two fluorescent tubes 46c increase in luminance as much as the minimum luminances of the two fluorescent tubes 46a (FIG. 11(f)). This prevents the back light 32c from dropping in luminance due to the turning-off of the two fluorescent tubes 46a. That is, the back light 32c makes little variation in luminance when the two fluorescent tubes 46a are turned off.

Subsequently, while receiving the selecting signal OPTc of high level, the signal generating unit 66j outputs a light volume adjusting signal ADJj for adjusting the luminances of the fluorescent tubes 46c so that the luminance gap signal GAP decreases. Consequently, the two fluorescent tubes 46c decrease in luminance (FIG. 11(g)). With the decreasing luminances of the fluorescent tubes 46c, the back light 32c also decreases in luminance (FIG. 11(h)).

At time t3, the luminances of the two fluorescent tubes 46c reach the minimum luminances, and the detecting part 56 outputs the detecting signal DET1 (FIG. 11(i)). In synchronization therewith, the comparing unit 62 outputs the detecting signal DET2 (FIG. 11(i)). In response to the detecting signal DET2, the selecting unit 64c turns the selecting signal OPTc to low level and turns the selecting signals OPTg and OPTh to high level. In synchronization with the falling edge of the selecting signal OPTc, the signal generating unit 66j fixes the light volume adjusting signal ADJj to a turn-off level for turning off the fluorescent tubes 46c (turn-off operation). Then, the two fluorescent tubes 46c go out (FIG. 11(j)).

In response to the rising edge of the selecting signal OPTg, the signal generating unit 66g enhances a light volume adjusting signal ADJg steeply so that the fluorescent tube 46g increases in luminance as much as the minimum luminance of a single fluorescent tube 46c (FIG. 11(k)). In response to the rising edge of the selecting signal OPTh, the signal generating unit 66h enhances a light volume adjusting signal ADJh steeply so that the fluorescent tube 46h increases in luminance as much as the minimum luminance of a single fluorescent tube 46c (FIG. 11(l)). This prevents the back light 32c from dropping in luminance due to the turning-off of the two fluorescent tubes 46c. That is, the back light 32c makes little variation in luminance when the two fluorescent tubes 46c are turned off.

Subsequently, while receiving the selecting signal OPTg of high level, the signal generating unit 66g outputs a light volume adjusting signal ADJg for adjusting the luminance of the fluorescent tube 46g so that the luminance gap signal GAP decreases. Consequently, the fluorescent tube 46g decreases in luminance (FIG. 11(m)). In the meantime, the signal generating unit 66h, while receiving the selecting signal OPTh of high level, outputs a light volume adjusting signal ADJh for adjusting the luminance of the fluorescent tube 46h so that the luminance gap signal GAP decreases. Consequently, the fluorescent tube 46h decreases in luminance (FIG. 11(n)). With the decreasing luminances of the fluorescent tubes 46g and 46h, the back light 32c also decreases in luminance (FIG. 11(o)).

At time t4, the luminances of the fluorescent tubes 46g and 46h reach the minimum luminances, and the detecting part 56 outputs the detecting signal DET1 (FIG. 11(p)). In synchronization therewith, the comparing unit 62 outputs the detecting signal DET2 (FIG. 11(p)). In response to the detecting signal DET2, the selecting unit 64c turns the selecting signal OPTg to low level. Here, the selecting signal OPTh is kept at high level. In synchronization with the falling edge of the selecting signal OPTg, the signal generating unit 66g fixes the light volume adjusting signal ADJg to a turn-off level for turning off the fluorescent tube 46g (turn-off operation). Then, the fluorescent tube 46g goes out (FIG. 11(q)).

In response to the falling edge of the selecting signal OPTg, the signal generating unit 66h enhances the light volume adjusting signal ADJh steeply so that the fluorescent tube 46h increases in luminance as much as the minimum luminance of the fluorescent tube 46g (FIG. 11(r)). This prevents the back light 32c from dropping in luminance due to the turning-off of the fluorescent tube 46g. That is, the back light 32c makes little variation in luminance when the fluorescent tube 46g is turned off.

At time t5, the luminance of the fluorescent tube 46h reaches the minimum luminance, and the detecting part 56 outputs the detecting signal DET1 (FIG. 11(s)). In synchronization therewith, the comparing unit 62 outputs the detecting signal DET2 (FIG. 11(s)). Here, the back light 32c is at the minimum in luminance, so that the luminance indicated by the luminance detecting signal VD and the luminance indicated by the luminance adjusting signal LUM become equal. Then, the comparing unit 62 outputs a luminance gap signal GAP of 0 in magnitude. When the fluorescent tube 46h lit to the end becomes minimum in luminance, the brightness control circuit 48c makes no turn-off operation and keeps the fluorescent tube 46h lit at the minimum luminance.

As has been described, the liquid crystal display 28c of the present embodiment can offer the same effects as those of the foregoing first and second embodiments. Besides, in the present embodiment, when the luminance adjusting signal LUM for minimizing the luminance of the back light is received, only a single fluorescent tube 46h is lit at its minimum luminance while the other fluorescent tubes 46a, 46c, and 46g are turned off. The maximum luminance possible for the back light 32c to output is for situations where the six fluorescent tubes 46a, 46g, 46h, and 46c are lit at their maximum luminances. On this account, the minimum luminance of the back light 32c can be rendered one-sixth that of conventional back lights in which all the fluorescent tubes are lit together at the minimum luminances.

The fluorescent tubs 46g and 46h arranged in the centers of the reflectors 45 have an internal gas pressure higher than the internal gas pressure of the outer fluorescent tubes 46a and 46c. The fluorescent tubes 46g and 46h of smaller parasitic capacitance can thus be increased in impedance. Consequently, the fluorescent tubes 46a, 46g, 46h, and 46c can be made identical in the current that contributes to light emission, provided that relatively the same effective voltages are applied to all the fluorescent tubes 46a, 46g, 46h, and 46c. As a result, the fluorescent tubes 46a, 46g, 46h, and 46c can be made identical in life, allowing extended life of the back light 32c.

Figure 12:
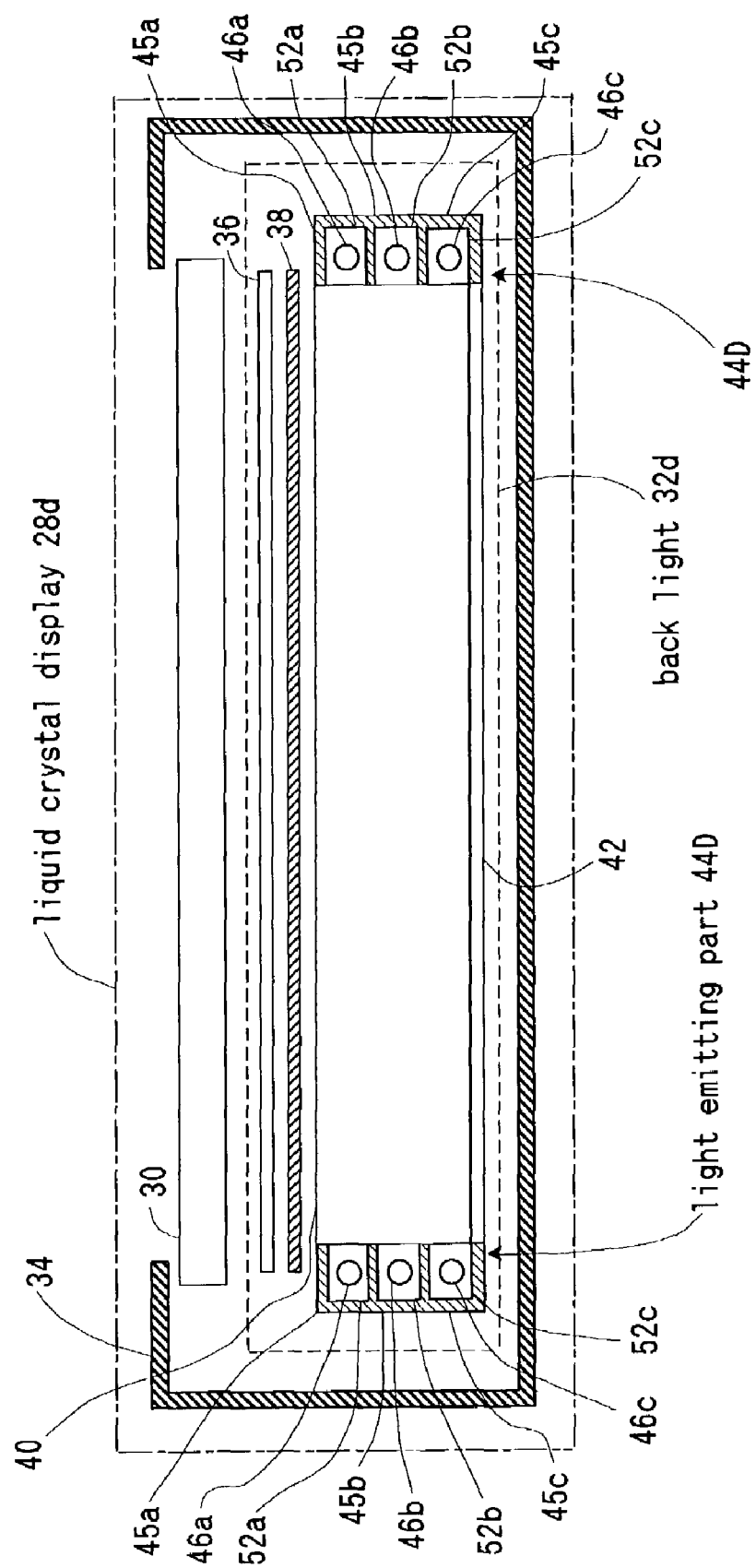
FIG. 12 is a block diagram showing a fourth embodiment of the liquid crystal display of the present invention.

FIG. 12 shows a fourth embodiment of the liquid crystal display of the present invention. The same elements as those of the first and second embodiments will be designated by identical reference numbers or symbols. Detailed description will be omitted of these elements. A liquid crystal display 28d includes a liquid crystal panel 30, a case 34, and a back light 32d of the present embodiment.

The back light 32d has light emitting parts 44D arranged on both sides of a light guide plate 40, respectively. In this embodiment, each light emitting part 44D has reflectors 45a, 45b, and 45c for accommodating fluorescent tubes 46a, 46b, and 46c, respectively. The brightness control circuit and the lighting control circuits are the same as in the second embodiment.

The reflectors 45a, 45b, and 45c are identical to one another. The inner surfaces of the reflectors 45a, 45b, and 45c are provided with reflecting parts 52a, 52b, and 52c (reflecting coats) for reflecting the light emitted from the fluorescent tubes 46a, 46b, and 46c, respectively. The reflectors 45a, 45b, and 45c are arranged with their apertures toward the sides of the light guide plate 40.

The physical relationship between the fluorescent tube 46a and the reflector 45a, the physical relationship between the fluorescent tube 46b and the reflector 45b, and the physical relationship between the fluorescent tube 46c and the reflector 45c are identical. For this reason, all the parasitic capacitances occurring between the fluorescent tubes 46a, 46b, and 46c, and the reflectors 45a, 45b, and 45c accommodating the respective fluorescent tubes 46a, 46b, and 46c are the same.

The areas of parts of the reflectors 45a, 45b, and 45c where there is no obstacle between the fluorescent tubes 46a, 46b, and 46c and the reflectors 45a, 45b, and 45c, and they face to each other, respectively, are greater than in the cases where a single reflector accommodates three fluorescent tubes 46a, 46b, and 46c. This allows improved conductive efficiency of dissipating the heat produced by the lit fluorescent tubes 46a, 46b, and 46c to the reflectors 45a, 45b, and 45c.

As has been described, the liquid crystal display 28d of the present embodiment can offer the same effects as those of the foregoing second embodiment. In addition, the present embodiment provides the reflectors 45a, 45b, and 45c for accommodating the fluorescent tubes 46a, 46b, and 46c, respectively. The heat produced by the fluorescent tubes 46a, 46b, and 46c can thus be dissipated with higher efficiency.

Accommodating the fluorescent tubes 46a, 46b, and 46c in the reflectors 45a, 45b, and 45c, respectively, equalizes the parasitic capacitances between the fluorescent tubes 46a, 46b, and 46c and the reflectors 45a, 45b, and 45c. Consequently, the currents flowing through the respective fluorescent tubes 46a, 46b, and 46c can be made identical so that the fluorescent tubes 46a, 46b, and 46c become equal in life. As a result, the life of the back light 32d can be prolonged.

Figure 13:
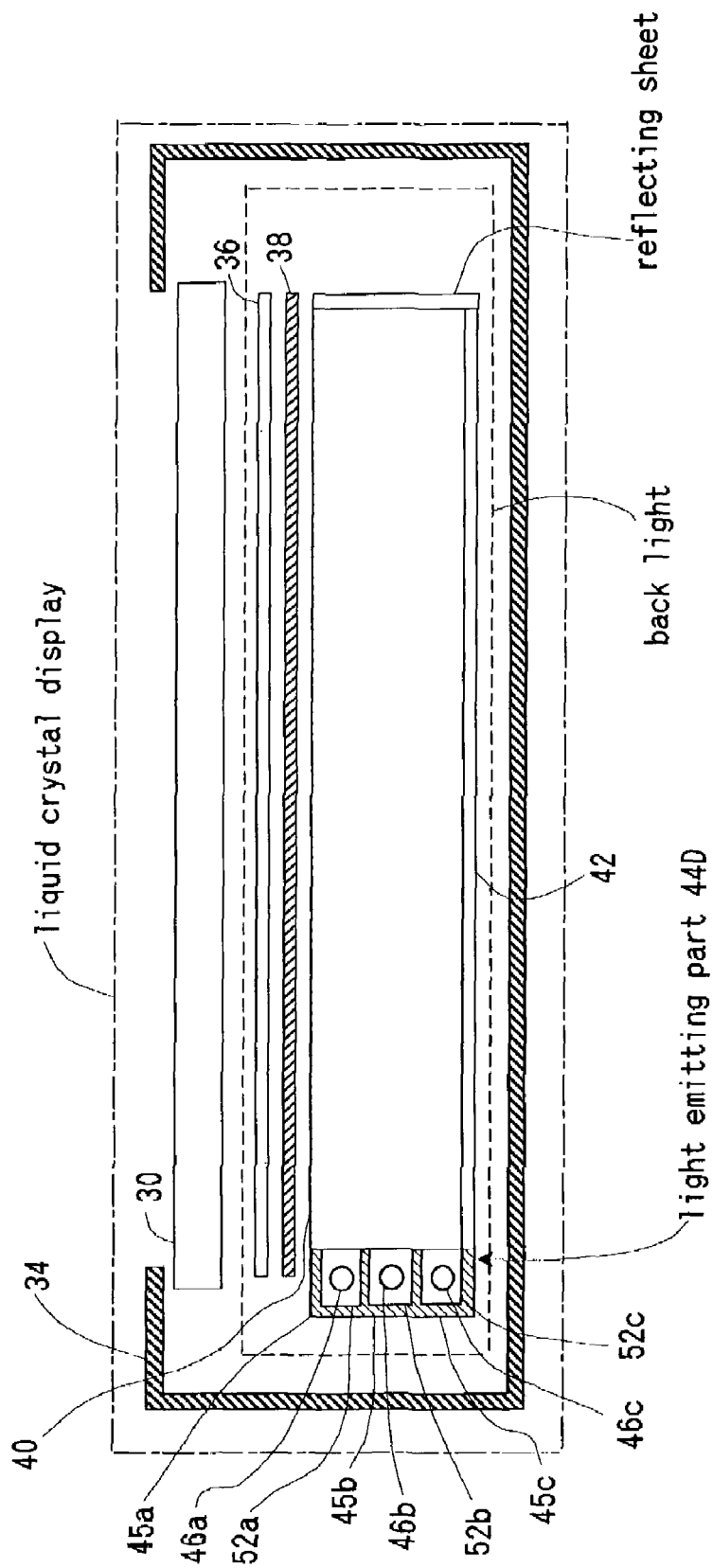
FIG. 13 is a block diagram showing a structural example of the back light in which the fluorescent tubes are disposed on only one side of a light guide plate.

Incidentally, the foregoing first to fourth embodiments have dealt with the cases where the light emitting parts (reflectors and fluorescent tubes) are arranged on both sides of the light guide plate 40, respectively. However, the present invention is not limited to such embodiments. For example, a light emitting part may be arranged on either side of the light guide plate, as shown in FIG. 13.

The invention is not limited to the above embodiments and various modifications may be made without departing from the spirit and scope of the invention. Any improvement may be made in part or all of the components.

What is claimed is:

1. A back light comprising:
   a plurality of light sources;
   a brightness control circuit for selecting and adjusting at least one of a plurality of light volume adjusting signals, and fixing output of the rest of said light volume adjusting signals according to a luminance adjusting signal when said luminance adjusting signal changes, said light volume adjusting signals being for adjusting said light sources in luminance, respectively, said luminance adjusting signal being for adjusting a total luminance of said light sources; and
   a plurality of lighting control circuits corresponding to said plurality of light sources, respectively, for receiving said light volume adjusting signals and adjusting voltage waveforms to be applied to said light sources according to the received light volume adjusting signals, respectively,
   wherein said brightness control circuit comprises:
   a detecting part for outputting a detecting signal when a luminance of one of said light sources corresponding to a selected light volume adjusting signal reaches a minimum luminance; and
   an adjusting part for successively performing a luminance-down operation, a turn-off operation, and a selecting operation while a luminance indicated by said luminance adjusting signal is smaller than an actual total luminance of said light sources, said luminance-down operation being for changing said selected light volume adjusting signal to lower luminances of the respective light sources, said turn-off operation being for fixing said selected light volume adjusting signal to a turn-off level of said light sources in response to said detecting signal, said selecting operation being for selecting anew, in response to said detecting signal, another one of said light volume adjusting signals corresponding to a light source which is lit.

2. The back light according to claim 1, wherein said adjusting part changes, in synchronization with said turn-off operation, one of said light volume adjusting signals corresponding to at least one of said light sources in which are lit so as to enhance at least one of said light sources in luminance temporarily.

3. The back light according to claim 1, wherein said detecting part includes a monitoring circuit for detecting that the luminance of each of said light sources reaches the minimum luminance by detecting a current supplied to each of said light sources.

4. The back light according to claim 1, wherein when said luminance adjusting signal indicates a minimum luminance, said brightness control circuit selects and adjusts only one of said light volume adjusting signals to turn on its corresponding light source at the minimum luminance, and fixes the rest of said light volume adjusting signals to a turn-off level at which their corresponding light sources are turned off.

5. A back light comprising:
   a plurality of light sources;
   a brightness control circuit for selecting and adjusting at least one of a plurality of light volume adjusting signals, and fixing output of the rest of said light volume adjusting signals according to a luminance adjusting signal when said luminance adjusting signal changes, said light volume adjusting signals being for adjusting said light sources in luminance, respectively, said luminance adjusting signal being for adjusting a total luminance of said light sources; and
   a plurality of lighting control circuits corresponding to said plurality of light sources, respectively, for receiving said light volume adjusting signals and adjusting voltage waveforms to be applied to said light sources according to the received light volume adjusting signals, respectively; and
   a reflector containing said light sources, said reflector having a reflecting part for reflecting light emitted from said light sources, wherein:
   said light sources are fluorescent tubes;
   different parasitic capacitances occur between said fluorescent tubes and said reflecting part according to positions of said fluorescent tubes relative to said reflecting part; and
   said lighting control circuits set an effective voltage applied to one of said fluorescent tubes having a relatively small parasitic capacitance to be lower than an effective voltage applied to another one of said fluorescent tubes having a relatively large parasitic capacitance.

6. A back light comprising:

a plurality of light sources;

a brightness control circuit for selecting and adjusting at least one of a plurality of light volume adjusting signals, and fixing output of the rest of said light volume adjusting signals according to a luminance adjusting signal when said luminance adjusting signal changes, said light volume adjusting signals being for adjusting said light sources in luminance, respectively, said luminance adjusting signal being for adjusting a total luminance of said light sources;

a plurality of lighting control circuits corresponding to said plurality of light sources, respectively, for receiving said light volume adjusting signals and adjusting voltage waveforms to be applied to said light sources according to the received light volume adjusting signals, respectively; and a reflector containing said light sources, said reflector having a reflecting part for reflecting light emitted from said light sources, wherein:

said light sources are fluorescent tubes; and different parasitic capacitances occur between said fluorescent tubes and said reflecting part according to positions of said fluorescent tubes relative to said reflecting part; and a diameter of one of said fluorescent tubes having a relatively small parasitic capacitance is smaller than a diameter of another one of said fluorescent tubes having a relatively large parasitic capacitance.

7. A back light comprising:

a plurality of light sources;

a brightness control circuit for selecting and adjusting at least one of a plurality of light volume adjusting signals, and fixing output of the rest of said light volume adjusting signals according to a luminance adjusting signal when said luminance adjusting signal changes, said light volume adjusting signals being for adjusting said light sources in luminance, respectively, said luminance adjusting signal being for adjusting a total luminance of said light sources; and a plurality of lighting control circuits corresponding to said plurality of light sources, respectively, for receiving said light volume adjusting signals and adjusting voltage waveforms to be applied to said light sources according to the received light volume adjusting signals, respectively; and a reflector containing said light sources, said reflector having a reflecting part for reflecting light emitted from said light sources, wherein:

said light sources are fluorescent tubes;

different parasitic capacitances occur between said fluorescent tubes and said reflecting part according to positions of said fluorescent tubes relative to said reflecting part; and a pressure of internal gas contained in one of said fluorescent tubes disposed in a position in which a relatively small parasitic capacitance occurs is higher than a pressure of internal gas contained in another one of said fluorescent tubes disposed in a position in which a relatively large parasitic capacitance occurs.

8. The back light according to claim 1, comprising a plurality of reflectors containing said light sources, respectively, said reflectors having reflecting parts for reflecting light emitted from said light sources, respectively.

9. A back light comprising:

a plurality of fluorescent tubes;

a reflector containing said plurality of fluorescent tubes, said reflector having a reflecting part for reflecting light emitted from said fluorescent tubes; and a plurality of lighting control circuits for adjusting voltage waveforms to be applied to said fluorescent tubes, wherein different parasitic capacitances occur between said fluorescent tubes and said reflecting part according to positions of said fluorescent tubes relative to said reflecting part; and said lighting control circuits set an effective voltage applied to one of said fluorescent tubes having a relatively small parasitic capacitance to be lower than an effective voltage applied to another one of said fluorescent tubes having a relatively large parasitic capacitance.

10. A back light comprising:

a plurality of fluorescent tubes; and a reflector containing said plurality of fluorescent tubes, said reflector having a reflecting part for reflecting light emitted from said fluorescent tubes, wherein:

different parasitic capacitances occur between said fluorescent tubes and said reflecting part according to positions of said fluorescent tubes relative to said reflecting part; and a diameter of one of said fluorescent tubes having a relatively small parasitic capacitance is smaller than a diameter of another one of said fluorescent tubes having a relatively large parasitic capacitance.

11. A back light comprising:

a plurality of fluorescent tubes; and a reflector containing said plurality of fluorescent tubes, said reflector having a reflecting part for reflecting light emitted from said fluorescent tubes, wherein different parasitic capacitances occur between said fluorescent tubes and said reflecting part according to positions of said fluorescent tubes relative to said reflecting part; and a pressure of internal gas contained in one of said fluorescent tubes disposed in a position in which a relatively small parasitic capacitance occurs is higher than a pressure of internal gas contained in another one of said fluorescent tubes disposed in a position in which a relatively large parasitic capacitance occurs.

12. A liquid crystal display comprising:

a liquid crystal panel;

a plurality of light sources arranged in rear of said liquid crystal panel;

a brightness control circuit for selecting and adjusting at least one of a plurality of light volume adjusting signals, and fixing output of the rest of said light volume adjusting signals according to a luminance adjusting signal when said luminance adjusting signal changes, said light volume adjusting signals being for adjusting said light sources in luminance, respectively, said luminance adjusting signal being for adjusting a total luminance of said light sources; and a plurality of lighting control circuits corresponding to said light sources, respectively, for receiving said light volume adjusting signals and adjusting voltage waveforms to be applied to said light sources according to the received light volume adjusting signals, respectively, wherein said brightness control circuit comprises:

a detecting part for outputting a detecting signal when a luminance of one of said light sources corresponding to a selected light volume adjusting signal reaches a minimum luminance; and an adjusting part for successively performing a luminance-down operation, a turn-off operation, and a selecting operation while a luminance indicated by said luminance adjusting signal is smaller than an actual total luminance of said light sources, said luminance-down operation being for changing said selected light volume adjusting signal to lower luminances of the respective light sources, said turn-off operation being for fixing said selected light volume adjusting signal to a turn-off level of said light sources in response to said detecting signal, said selecting operation being for selecting anew, in response to said detecting signal, another one of said light volume adjusting signals corresponding to a light source which is lit.

13. The liquid crystal display according to claim 12, comprising a light guide plate placed in the rear of said liquid crystal panel, wherein said light sources are placed on one side of said light guide plate.

14. The liquid crystal display according to claim 12, comprising a light guide plate placed in the rear of said liquid crystal panel, wherein said light sources are placed on both sides of said light guide plate.

* * * * *